United States Patent [19]

Divjak et al.

[11] Patent Number: 5,142,396
[45] Date of Patent: Aug. 25, 1992

[54] DIFFUSED INFRARED COMMUNICATION CONTROL SYSTEM

[75] Inventors: August A. Divjak, Waukesha; David W. Christenson, Milwaukee; Richard J. Huhn, Franklin; Paul G. Kucharski, South Milwaukee; Daniel E. Schuster, Milwaukee, all of Wis.

[73] Assignee: Johnson Service Company, Milwaukee, Wis.

[21] Appl. No.: 501,420

[22] Filed: Mar. 26, 1990

Related U.S. Application Data

[63] Continuation of Ser. No. 387,367, Jul. 28, 1989, abandoned, which is a continuation of Ser. No. 29,075, Mar. 23, 1987, abandoned.

[51] Int. Cl.⁵ .................................... H04B 10/00
[52] U.S. Cl. .................... 359/142; 359/152; 340/825.72
[58] Field of Search ............ 455/603, 604, 608, 617, 455/606-607, 617; 370/3, 4; 359/142, 143, 144, 148, 152, 165, 167; 340/825.72

[56] References Cited

U.S. PATENT DOCUMENTS

| | | | |
|---|---|---|---|
| 3,815,093 | 6/1974 | Caretto | 340/825.54 |
| 3,924,120 | 12/1975 | Cox, III | 455/603 |
| 4,229,830 | 10/1980 | Ryan | 370/8 |
| 4,294,682 | 10/1981 | Deczry | 455/607 |
| 4,325,146 | 4/1982 | Lennington | 455/604 |
| 4,402,090 | 8/1983 | Gfeller | 370/4 |
| 4,558,465 | 12/1985 | Siegel et al. | 455/609 |
| 4,677,608 | 6/1987 | Forsberg | 370/3 |
| 4,717,913 | 1/1988 | Elger | 455/601 |
| 4,727,600 | 2/1988 | Avakian | 455/601 |
| 4,779,319 | 10/1988 | Juenger | 455/603 |

Primary Examiner—Edward L. Coles, Sr.
Assistant Examiner—Kinfe-Michael Negash
Attorney, Agent, or Firm—E. L. Levine

[57] ABSTRACT

An improved control system utilizing infrared communication channels for remote station control is provided. A central base controller communicates with one or more channels of sub-networks through one or more field interface controllers. Each field interface controller utilizes a dedicated base infrared transceiver for transmitting envelopes of definable duration at a preselected infrared oscillation frequency. At least one remote station receives said transmitted infrared signals at an infrared transceiver tuned to said oscillation frequency. Associated devices at the remote station decode the information from said infrared transmission or issue instructions and information to an associated input/output device. Communication over the infrared channel between the base and the remote stations utilizes a unique pulse position protocol. An initiating clear pulse begins all communications. The remote station responds to the time-location of ensuing pulses following the initiating pulse. The time of occurrence of the pulse indicates the appropriate response necessary from the remote station, which station correspondingly sends back infrared pulses in predetermined time slots and requires acknowledgement signals from the base station for resetting for further processing. Associated hardware is provided for providing decoding of the unique communication protocol.

41 Claims, 26 Drawing Sheets

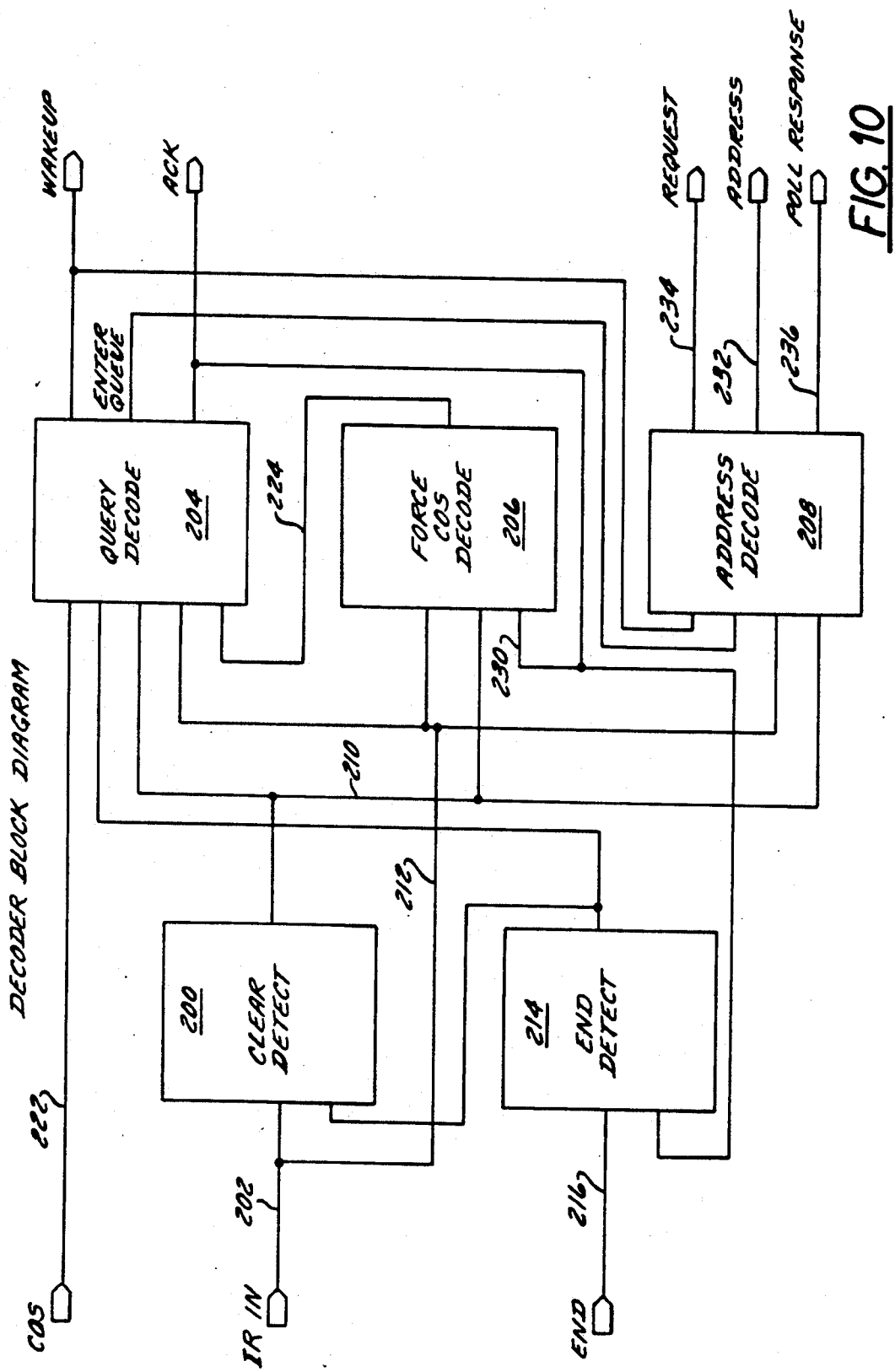

DIFFUSED INFRARED COMMUNICATION CONTROL SYSTEM

This application is a continuation of application Ser. No. 07/387,367 filed Jul. 28, 1989 (now abandoned) which is a continuation of application Ser. No. 029,075 filed Mar. 23, 1987 (now abandoned).

BACKGROUND OF THE INVENTION

The present invention relates generally to the system control art and related communication between controlling apparatus and controlled apparatus in such systems. More particularly, the present invention relates to communication systems for use in industrial, or other, control systems, including heating, ventilating, and air conditioning (HVAC) systems. In its preferred embodiment, the present invention provides an infrared communication system with associated hardware and a communication protocol for use in an HVAC or other control system.

Control systems are well established and well known in a variety of applications. Likewise, a variety of control systems are presently utilized for HVAC control applications. Typically, such systems comprise a plurality of remote points, such as blowers, ventilators and thermostats, associated with a common controlling unit. In such systems, a base controller monitors the conditions at the various remote points and issues instructions to those points or other points in response to changes in the conditions being monitored or in response to instructions entered at the base controller.

HVAC control systems also face a variety of common problems. Initially, there is a large cost in the installation and wiring for each of the remote points, even in a single room. In a central room containing air conditioning and heating equipment, the additional wiring and remote point sensors can add undesirably to the clutter. Maintenance costs similarly can be amplified when hardwired sensors need to be checked or repaired. The wide variation among the types of equipment utilized in any one system, e.g., ventilator motors, servos, thermostats or other temperature gauges, also can present maintenance, cost and installation obstacles. Finally, electromagnetic noise frequently generated in the starting and stopping of various motors used in the HVAC or other systems can create undesirable noise in the hardwire communication with the base controller, as these lengthy wires may act as antennas. This can be particularly troublesome in an HVAC application, because erroneous temperature readings and/or circulation settings can lead quickly to physically uncomfortable environments for those in the controlled building.

SUMMARY OF THE INVENTION

Therefore, it is principal object of the present invention to provide a communication control system which generally overcomes the deficiencies present in the prior art.

It is a further object of the present invention to provide an improved HVAC control system.

It is a further object of the present invention to provide an infrared (IR) communication control system for use in HVAC or other control environments.

A further object of the present invention is to provide a reliable infrared communication link in an HVAC system to eliminate hardwiring, maintenance and material costs while also, at least partially, overcoming electromagnetic and other noise problems attendant in typical HVAC control environments.

It is a further object of the present invention to provide a viable infrared communication protocol for use in typical industrial control environment, including HVAC systems.

Yet another object of the present invention is to provide functional apparatus for implementation of an improved infrared communication system having a base controller and a plurality of remote field points.

Yet another object of the present invention is to provide compatibility of existing HVAC systems and existing hardware with an improved HVAC system through both the apparatus used to implement the improved system and the protocol for operating that apparatus.

A final object of the present invention is to provide a communication control system which optimizes power consumption, particularly at the remote field point locations.

The system of the present invention applies conventional infrared light emitting diodes (LED's) and photosensitive diodes (e.g., PIN's) to transmit and receive pulses of infrared light energy. The infrared communication protocol utilizes pulse positioning modulation to encode the information, i.e., the information is encoded through the use of the spacing between the various pulses. To further enhance the versatility and performance of the system, each pulse comprises a modulated high frequency sub carrier, thereby resulting in a pulse-shaped envelope of predetermined duration for infrared transmission.

The system hardware consists of two main groupings of elements. At a base station, a field interface controller and base station infrared transceiver operate to provide a communication link with the base controller or overall system controller. At a plurality of field points, such as ventilation shafts, thermostats, etc., a variety of field point sensors interface with this system to monitor and control the HVAC inputs and outputs. An infrared transceiver and protocol decoder associated with the various field points communicate with the base station transceiver. More specifically, the field points may comprise analog inputs, binary inputs or binary outputs, an infrared transceiver and a protocol decoder. The point interface circuits are specifically designed for the type of field point being serviced. Preferably, all field points are self-powered using long life lithium batteries, although external 60 Hz. may be utilized when available and convenient (and is preferred for use with binary output boards).

The base station and field points communicate by means of a unique pulse-position protocol in which the information is decoded from the spacing between adjacent pulses or from a predefined clear pulse. In a preferred embodiment, transmission of a clear pulse of a defined duration by the base transceiver initiates the communication sequence. The transmission of a second pulse having a second duration at a predetermined interval after the clear pulse initiates a query sequence in which each field point responds if it has information to relay to the base station. The base controller differentiates between the responding field points by recognition of the time slot in which the respective field points transmit their responsive pulses. Subsequently, the base controller may initiate a direct communication sequence with a selected field point by transmitting a infrared pulse in the time slot corresponding to the address of the selected field point, the time slot being measured as a selected interval subsequent to a clear pulse. In response to an interrogating pulse in its addressed time slot, the field point responds to the base controller and transmits the information or receives a command. The base controller may also force each and every of the field points, or possibly selected groups of the field points, to respond by transmission of a pulse in a time slot address position which is unique for that purpose and has no corresponding field point, e.g. a pulse in a first time slot after the maximum time slot address for associated field points. In response to this forced reporting signal, each field point responds to a next occurrence of a second pulse, as described above, which indicates the initiation of the next query sequence, for example, by transmitting its address pulse in its address window. The field point then awaits a specific interrogation signal in its individual time slot address before initiating direct communication of information or status from the field point to the base controller.

The protocol provided by the present invention also helps assure that all points remain in touch with the base unit and that critical points receive extra attention to facilitate their accurate operation. Accordingly, any point which does not respond to a query signal within a sixty second interval must respond to a direct polling signal (critical points must report every five seconds or they must respond to the polling signal). The polling signal may comprise a second infrared pulse occurring a predetermined interval after the addressing signal for the individual point being polled. The appropriate response by the point comprises a responsive infrared pulse within another predefined interval.

The base controller may also issue commands to specific ones of the field points by first addressing the desired point. The command then follows the addressing pulse by a defined interval, the length of the interval being indicative of the command to be carried out by the addressed field point. While the field point is carrying out the command, it responds to the next query sequence; when addressed by the base unit, the field point then sends a responsive pulse at a defined time afterward to indicate that it is working on the command. Once the point completes the command function, it again responds to the next query signal; when subsequently addressed by the base unit, it responds with a pulse after a second defined interval to indicate to the base that it has completed the command.

Upon completion of a communication between the base and the point, the base unit may send an acknowledge pulse which resets the remote point for further information gathering or commands.

BRIEF DESCRIPTION OF THE FIGURES

The features of the present invention are set forth with particularity in the appended claims. Certain salient aspects of the invention have been indicated in the foregoing introduction and summary. Other and further objects, features and advantages will be apparent to those skilled in the art from the following detailed description taken in conjunction with the accompanying drawings. In particular, each of the appended claims may be taken as expressing objects and features of the present invention, both when viewed as a whole, and when considered as to individual recited features and as to respective defined interrelationships. The following general description and the relation of the various features of the invention may be further understood by reference to the accompanying drawings in which like reference numerals have been utilized to indicate like elements.

FIG. 4 which includes

FIG. 8 is an electrical schematic diagram of a transmitter portion of the infrared transceiver of FIG. 7;

FIG. 9, which includes

FIG. 10 is a representational block diagram of the protocol decoder for use in the infrared system of the present invention;

FIG. 11, which includes

FIG. 12, which includes FIGS. 12A–112B, is a further electrical schematic diagram of another portion of the protocol decoder in FIG. 10;

FIG. 14, which includes

FIG. 15, which includes

FIG. 16, which includes

DETAILED DESCRIPTION OF PREFERRED EMBODIMENTS

The present invention generally provides an improved heating, ventilating and air conditioning control system which is also envisioned to have application in other control environments, especially those which have similar cost, installation and space constraints.

Figure 1:
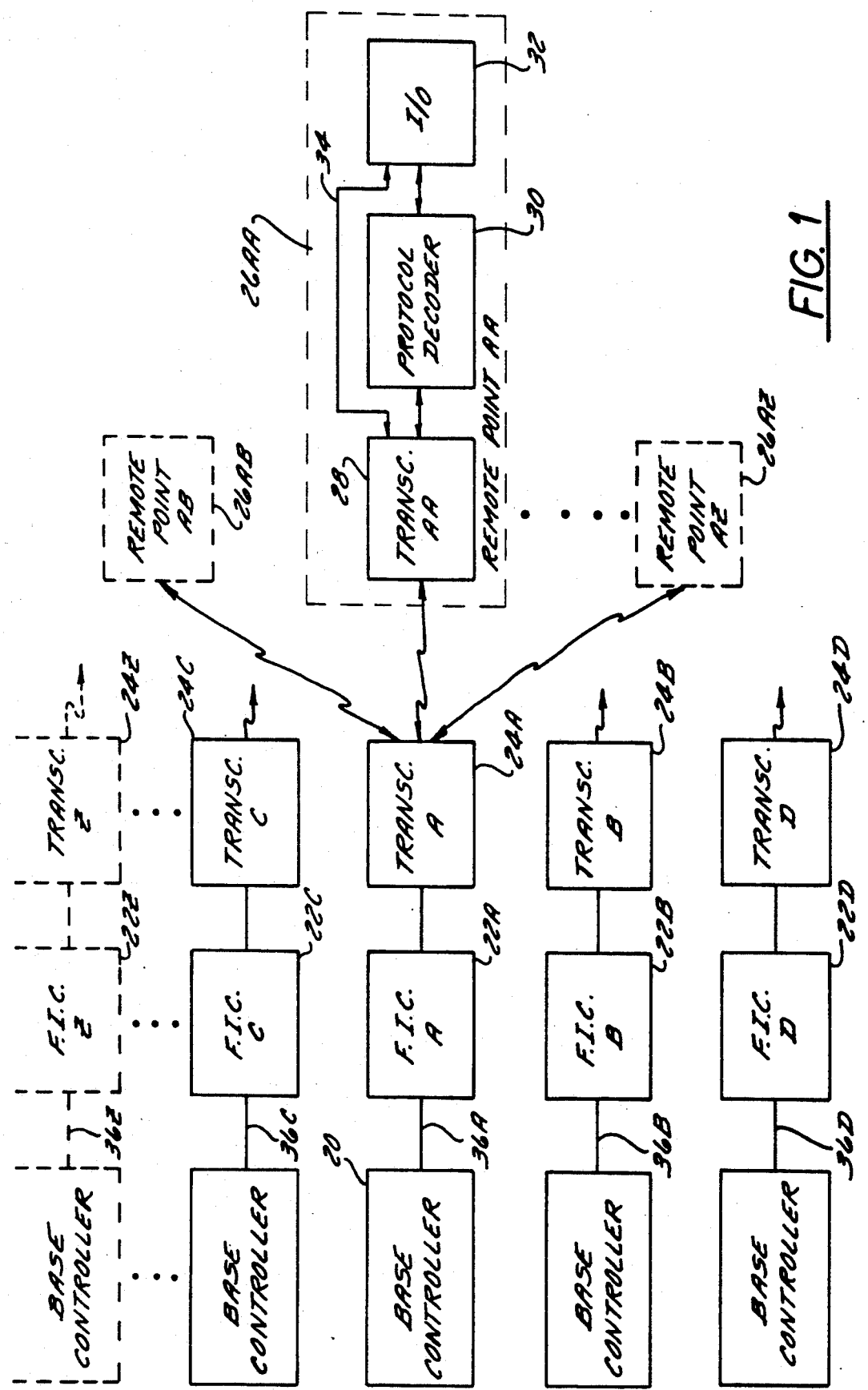
FIG. 1 is a representative block diagram of a system according to invention.

Referring now to FIG. 1, therein is illustrated a block diagram of a HVAC control system according to the present invention. Each of one or more base controllers 20 communicates by direct coupling with an associated field interface controller (FIC's 22A, 22B, 22C, 22D and so on). Each of the FIC's 22 communicates directly with an infrared base transceiver 24A, 24B, 24C, 24D and so on. Each of the infrared base transceivers 24 then communicates by infrared transmission with one or more field points 26A, 26B and so on. The remote field points each comprise a transceiver 28 which is coupled to a decoder 30 which is in turn coupled to an input-/output board 32. In some embodiments, the input/output board 32 may be coupled directly to the transceiver 28, as shown, by a line 34.

In operation, the base controller 20 selects an associated remote field point 26 of its associated FIC 22 which needs servicing and sends the appropriate signal via one of lines 36A, 36B, 36C and so on. The FIC then operates to encode the necessary information for transmission by the base transceiver 24 as infrared pulses having preselected duration and timing, a method referred to herein as Pulse Position Modulation. The appropriate one of remote points 26 decodes the transmitted infrared pulses as addressed by the time positioning of the transmitted pulses (as explained in more detail below). The remote transceiver 28 initially receives pulses at the remote point 26 and then passes them directly to the associated input/output device 32 for decoding or first passes them to a decoder 30, which processes them to generate control signals for the input/output device 32.

Input/output device 32 supplies data and status information back to the base station along the same transmission path by which it receives information and commands. That is, data originating at the input/output device 32 passes first to decoder 30 and then to transceiver 28 for transmission to the base station. Depending upon the type of input/output device 32 in use, the data may pass directly to transceiver 28 without need for decoder 30. At the base station, the transceiver 24 receives the encoded infrared pulses from remote transceiver 28 and passes them on to its associated FIC 22 for processing. The FIC 22 decodes the transmitted information and supplies the necessary data to base controller 20.

A plurality of FICs and base transceivers may be accommodated by the present system through the use of frequency encryption at the base transceiver. For example, transceiver 24A may transmit infrared pulses comprised of an envelope of 200 kHz. pulses. The corresponding remote points 26AA, AB, AC ... may then be tuned to respond to and decode only incoming signals at 200 kHz. Thus, base transceiver 24B may transmit infrared pulses comprised of an envelope of 250 kHz. pulses without interfering with the transmission of information and commands to remote point 26AA, AB, AC . . .

A corresponding plurality of remote points may be tuned to respond solely to the 250 kHz. frequency transmissions. Each of the remote points in the subnetwork associated with a given FIC and transceiver will transmit its information back to the base station as infrared pulse envelopes having the corresponding underlying frequency. In the previous example, remote transceiver 28 in remote field point 26AA will send its data as envelope pulses of 200 kHz. infrared pulses Accordingly, an entire network may be serviced by a single base controller 20 with each FIC 22 servicing a subnetwork up to its capacity. Of course, to optimize servicing time and efficient monitoring of the remote points, some or all of the desired FICs may be operated at less than full capacity if desired.

The utilization of infrared pulse envelopes provides a further advantage associated with the unique network control of the present invention. Specifically, by modulating the infrared information pulse, the "on" time for the remote transceiver is dramatically reduced. This results in corresponding power savings and facilitates the use of battery operated field points in many instances. This results in further savings in battery cost (by extended life) and in installation and maintenance costs otherwise necessary to provide power to the field point circuitry.

Figure 2:
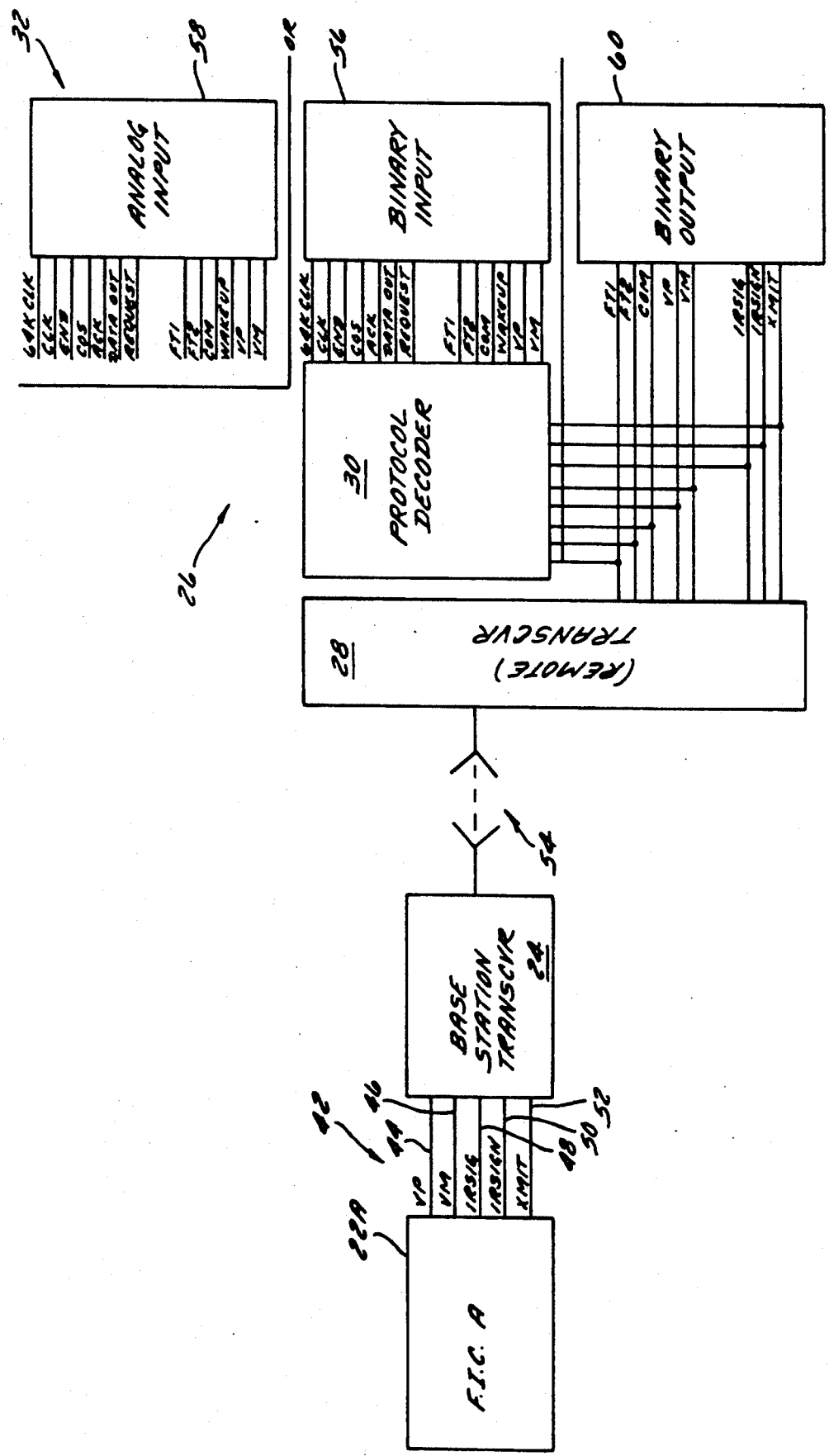
FIG. 2 is a more detailed block diagram of one channel of the system according to the present invention.
Figure 3A:
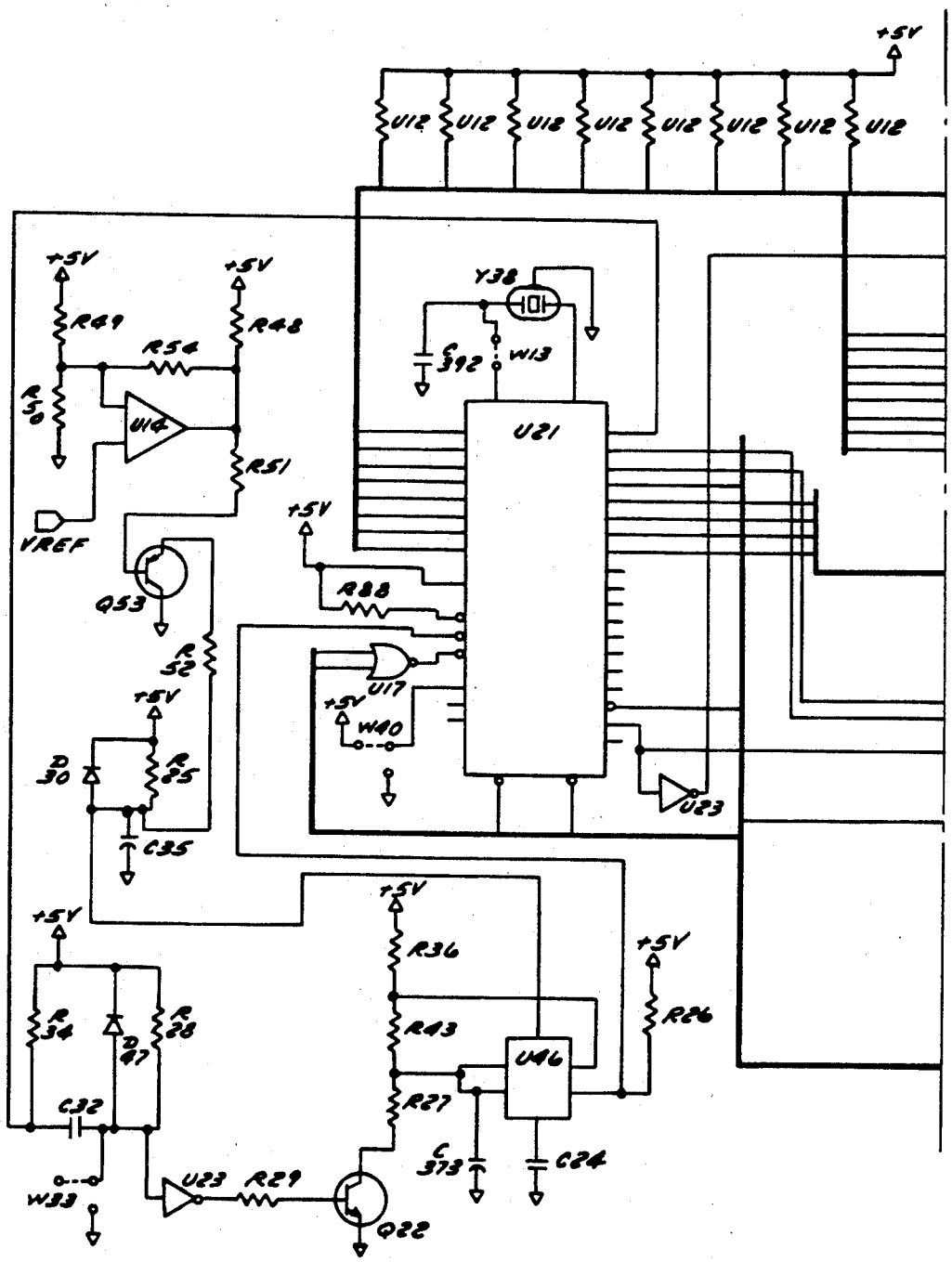
FIGS. 3A–3B, is an electrical schematic diagram of one portion of a field interface controller for use in the present invention.
Figure 3B:
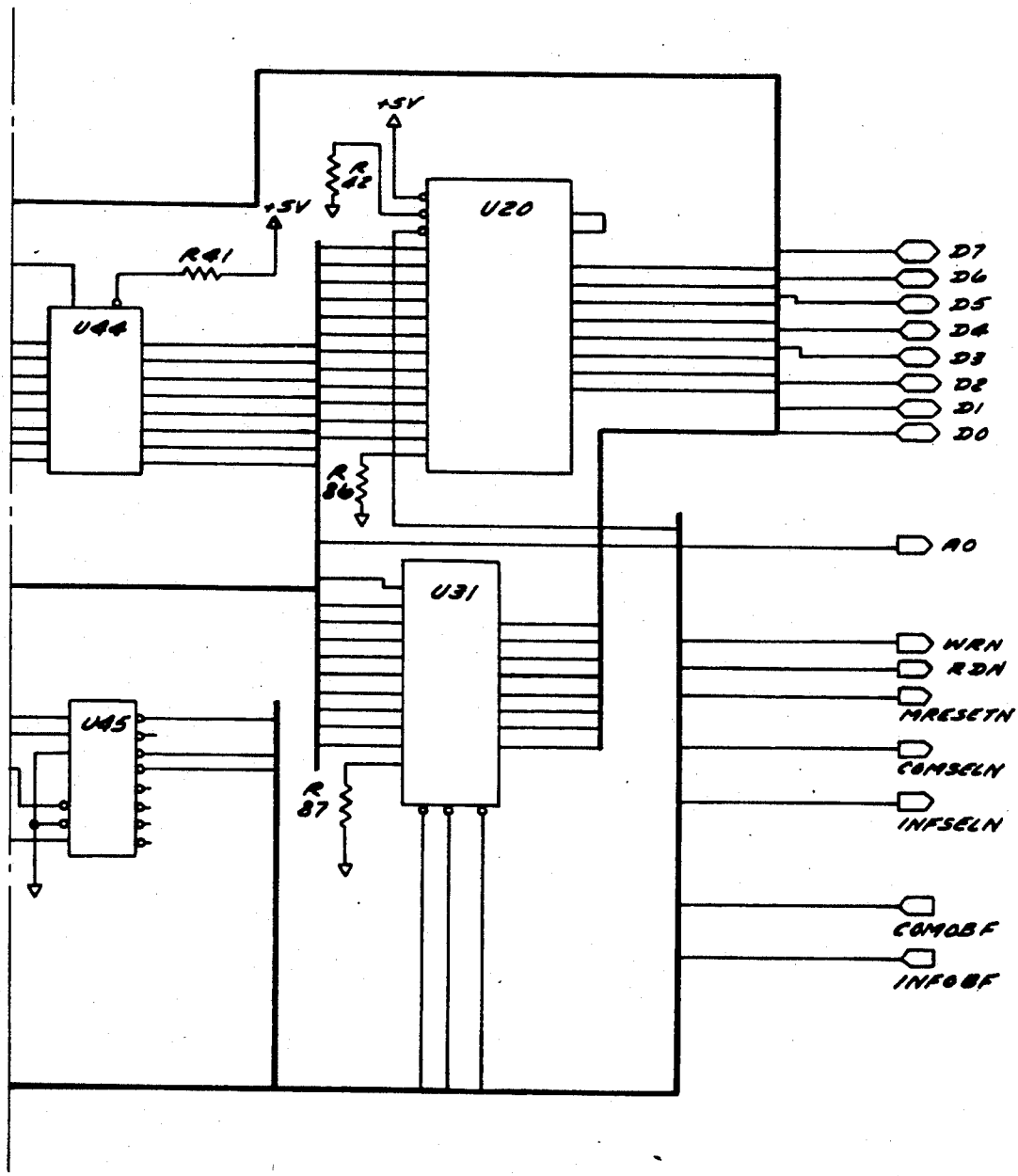
Figure 4A:
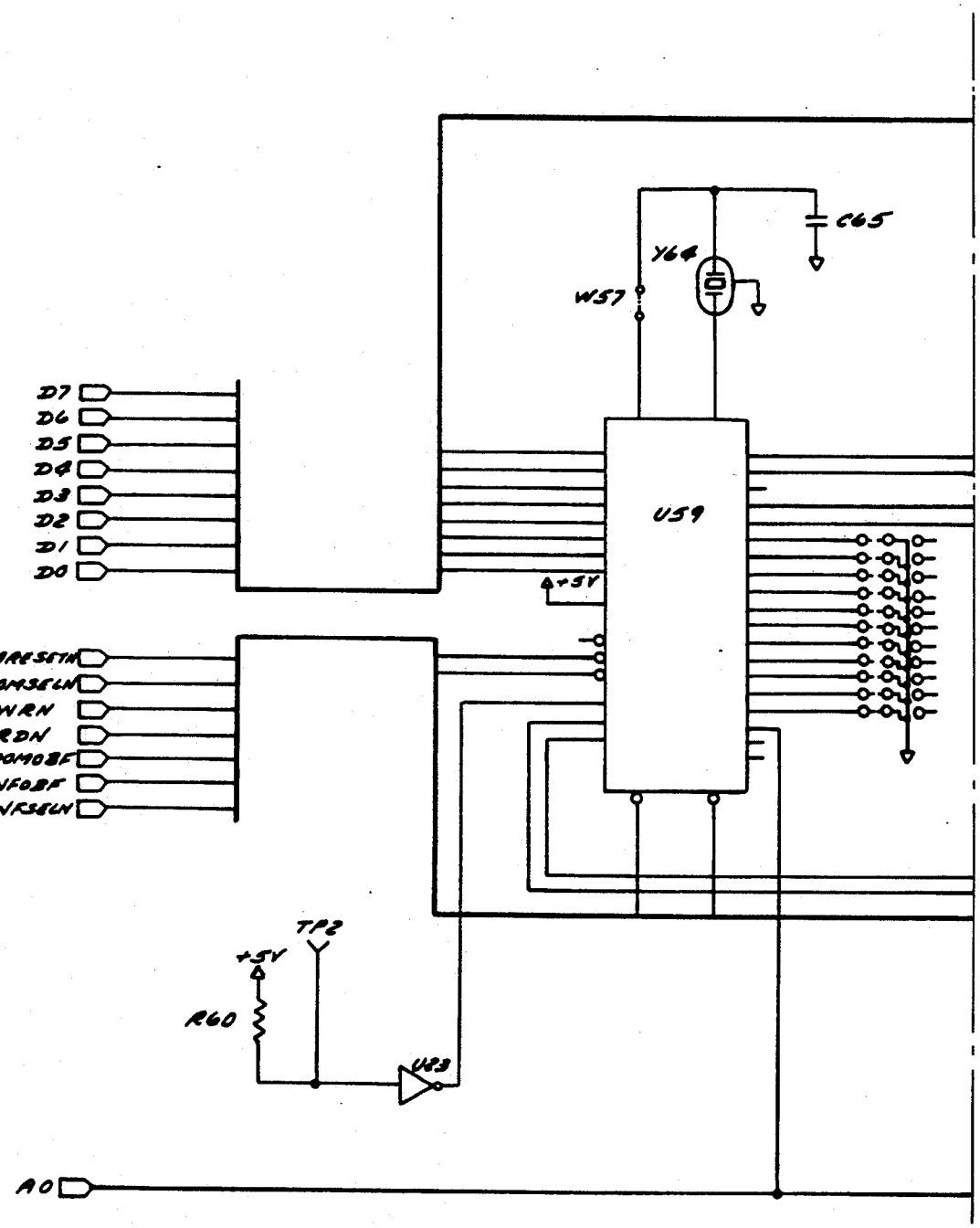
FIGS. 4A–4B, is a further schematic diagram of circuitry utilized in the field interface controller in conjunction with the present invention.
Figure 4B:
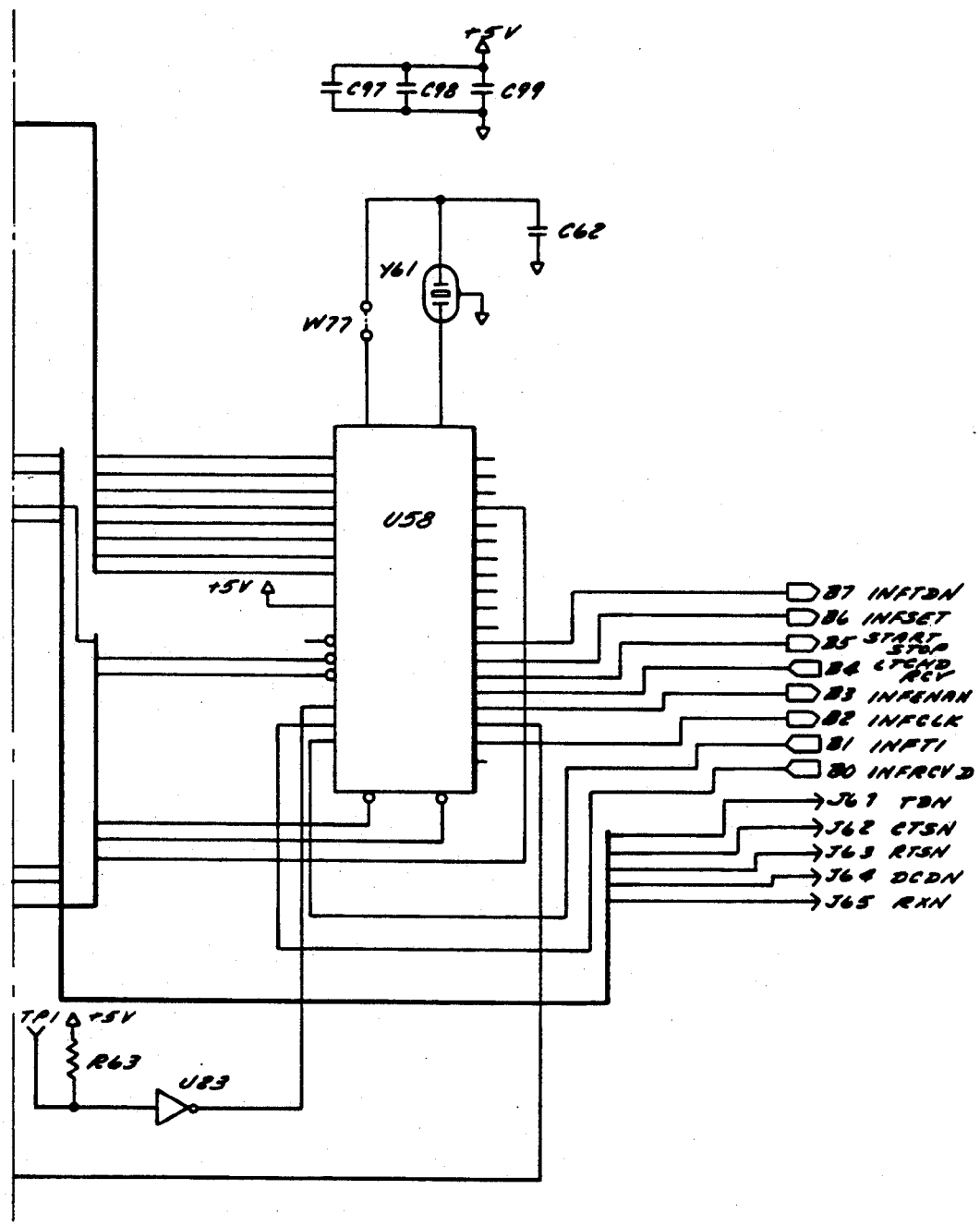
Figure 5:
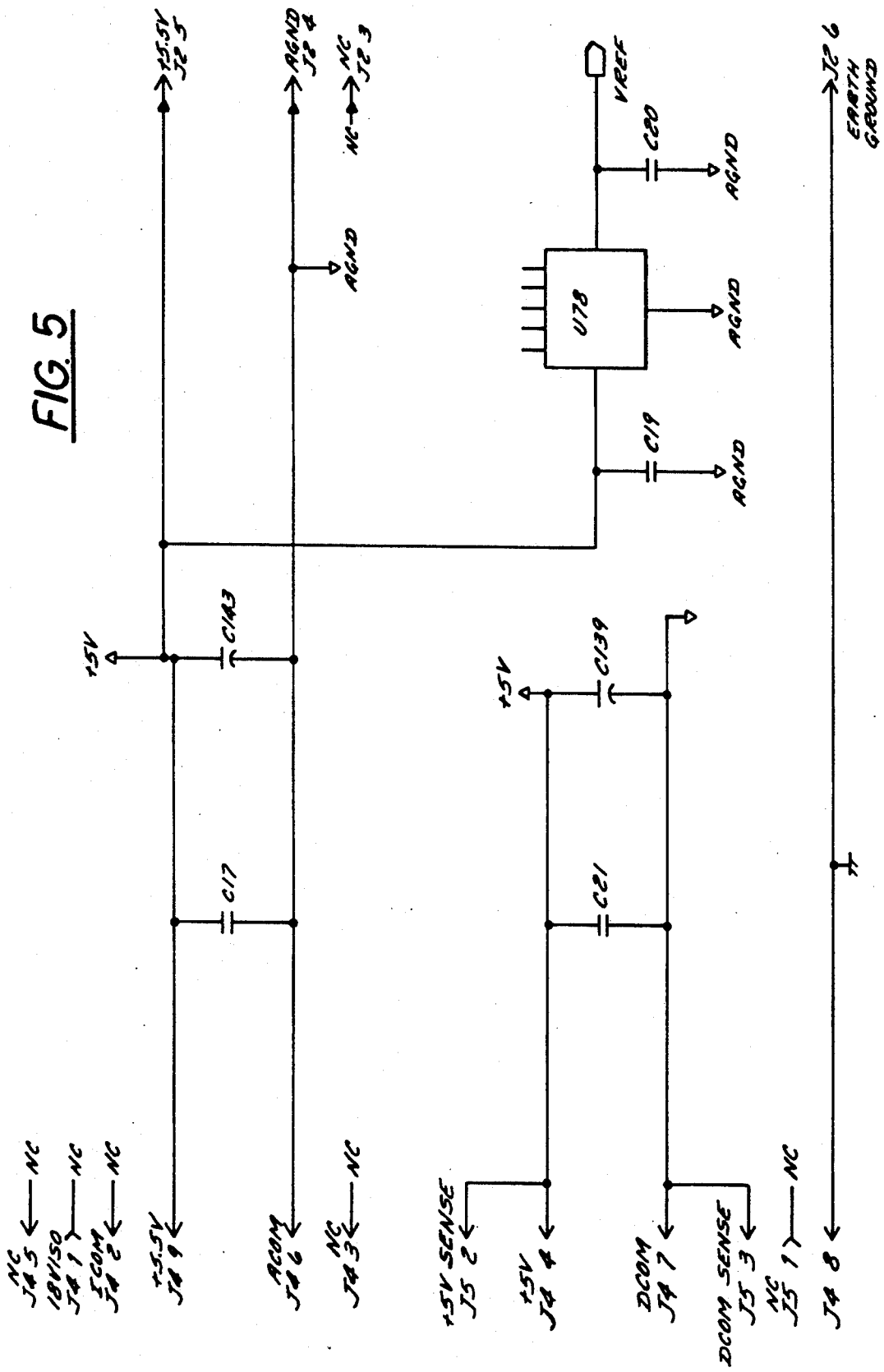
FIG. 5 is a further electrical schematic diagram of circuitry for use in a field interface controller in conjunction with the system of the present invention.
Figure 6:
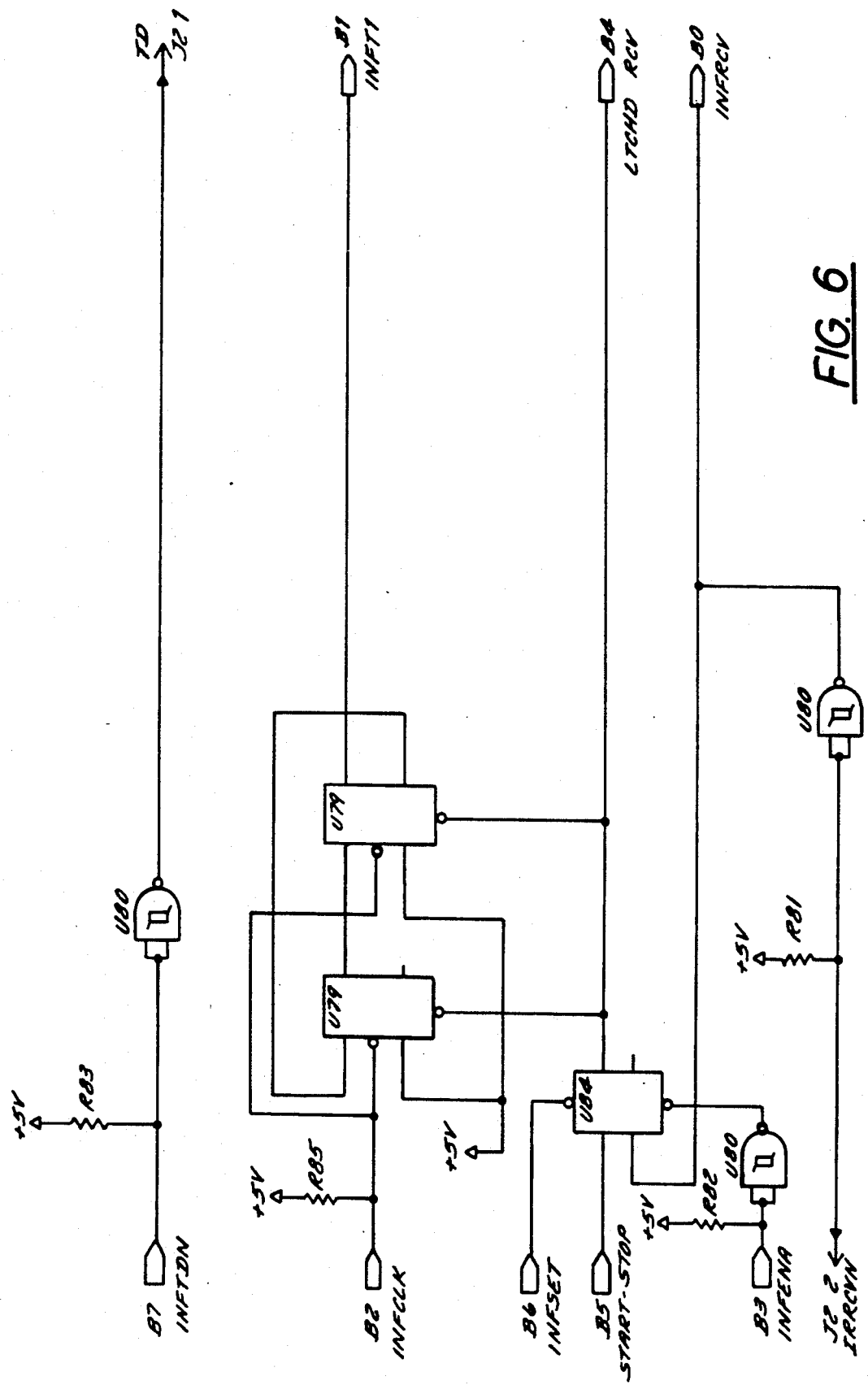
FIG. 6 is yet a further electrical schematic diagram of circuitry for utilization in the field interface controller in conjunction with the system of the present invention.

Referring now to FIG. 2, therein is shown a more detailed block diagram representation of a portion of a system according to the present invention.

FIC 22A communicates via communication channel 42 with the base transceiver 24. In the embodiment illustrated in FIG. 2, communication channel 42 comprises two separate transmission lines 50 (IRSIGN) and 52 or, in the alternative, lines 48 (IRSIG—the inverse of IRSIGN) and 52 to supply specific signals associated with the hardware chosen to accomplish the interfacing and transmission/receiving functions of the FIC 22 and the base transceiver 24. Lines 44 and 46 provide power and ground return functions. The operational function of the various signals on these lines will be explained in more detail below in conjunction with an explanation of the operation of that circuitry chosen for the preferred embodiment of the present invention. Naturally, the number of transmission lines may well vary depending upon the particular circuit embodiments chosen for the elements in any particular implementation of the present invention. Base station transceiver 24 then transmits the desired information and commands as infrared signals by means of an infrared channel 54, illustrated as a dashed line in FIG. 2.

Referring now to the right-hand side of FIG. 2, therein is shown an exemplary remote field point 26. As illustrated, remote field point 26 comprises a remote transceiver 28, a protocol decoder 30 and at least one input/output device 32. FIG. 2 illustrates the various interconnections between these devices. For example, an input/output device 32 comprises a binary input board 56 or an analog input board 58, and/or a binary output board 60. Infrared pulses received by remote transceiver 28 are processed by protocol decoder 30 and then passed to the binary input board 56 via the various lines illustrated. Data information received from the binary input board 56 is again processed in protocol decoder 30 and sent as output to the remote transceiver 28 for transmission to the base station.

Alternatively, the analog input board 58 may be utilized in place of the binary input board 56. Again the same lines transmit the information from protocol decoder 30 to analog input board 58 and from analog board 58 to protocol decoder 30.

In lieu of, or in addition to, the analog or binary input board 58 or 56, respectively, a binary output board 60 may be connected at the remote point 26. The binary output board 60 directly connects to the remote transceiver 28 in the preferred embodiment of the invention illustrated in FIG. 2. In this configuration, binary output board 60 directly decodes and encodes the information for transmission by the remote transceiver 28 without need for the protocol decoder 30. As shown, lines FT1, FD2, COM, VP, VM, IRSIG, IRSIGN and XMIT connect the binary output board 60 with the remote transceiver 28. These same lines connect the remote transceiver 28 with the protocol decoder 30 when a binary or analog input board is utilized. When a binary or analog input board such as 56 or 58 shown in FIG. 2 is connected at the remote point 26, the protocol decoder 30 is connected to that board via thirteen lines illustrated as 64KCLK, CLK, END, COS, ACK, Data-Out, Request, FT1, FT2, COM, Wake-Up, VP, and VM. Exemplary signals present on these lines and the function which those signals serve in conjunction with the operation of the present invention will be described more fully below in the discussion of the hardware utilized to implement the various elements of the remote point 26 illustrated in FIG. 2.

FIGS. 3, 4, 5 and 6 illustrate an exemplary embodiment of a field interface controller for use in the system of the present invention. The FIC embodiment shown in these figures effectuates the communication protocol or method (set forth below) for controlling the associated base transceiver for communicating with the remote field points to relay commands and inquiries from the base controller and data and status information from the field points. The use of a number of integrated circuit chips on the board of the FIC facilitates the signal processing necessary to implement the present invention, while also optimizing the use of space both on the circuit boards and in the design of the necessary cabinetry.

Figure 7:
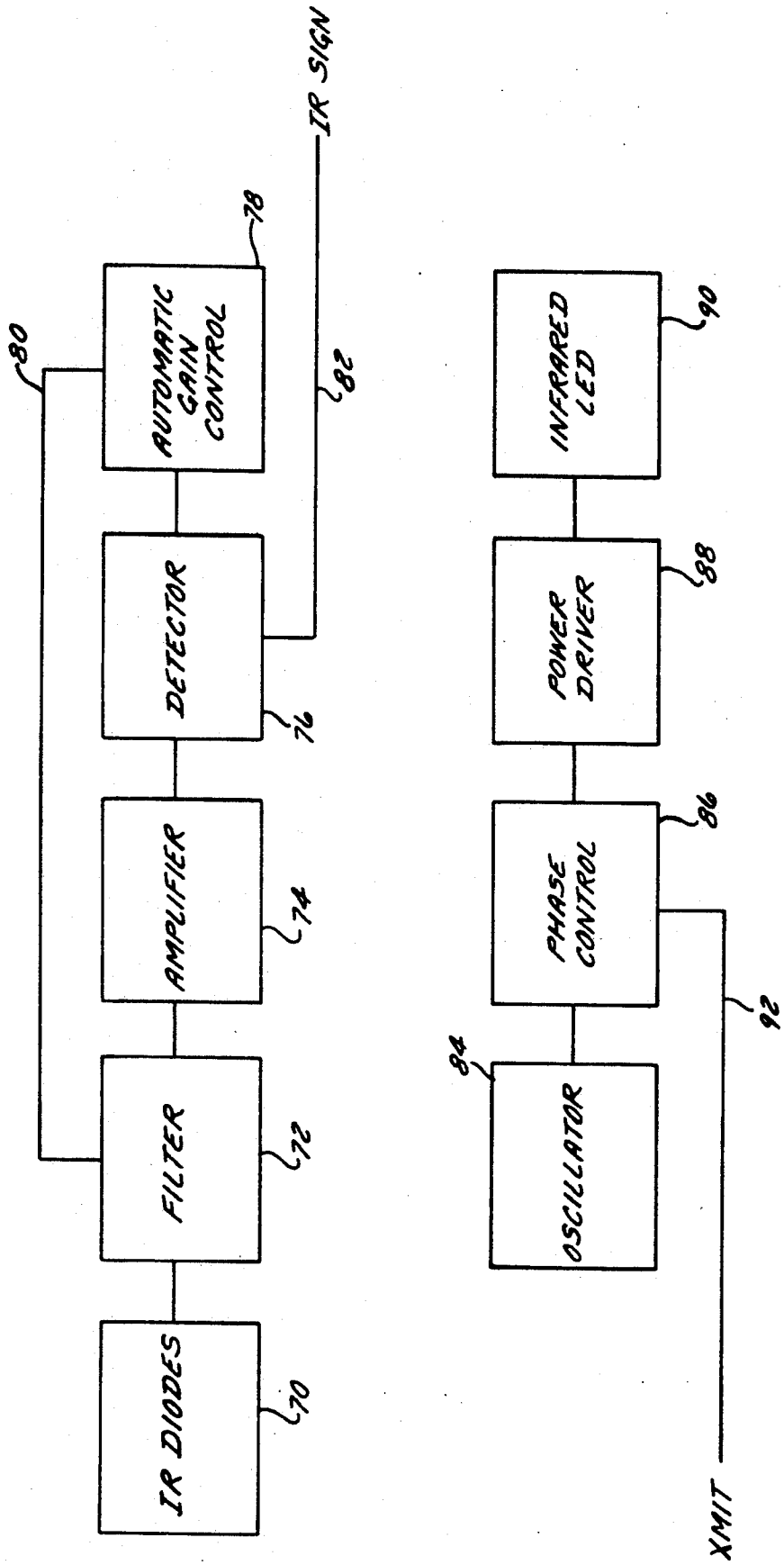
FIG. 7 is a representational block diagram of an infrared (IR) transceiver for use in the present invention.
Figure 3:
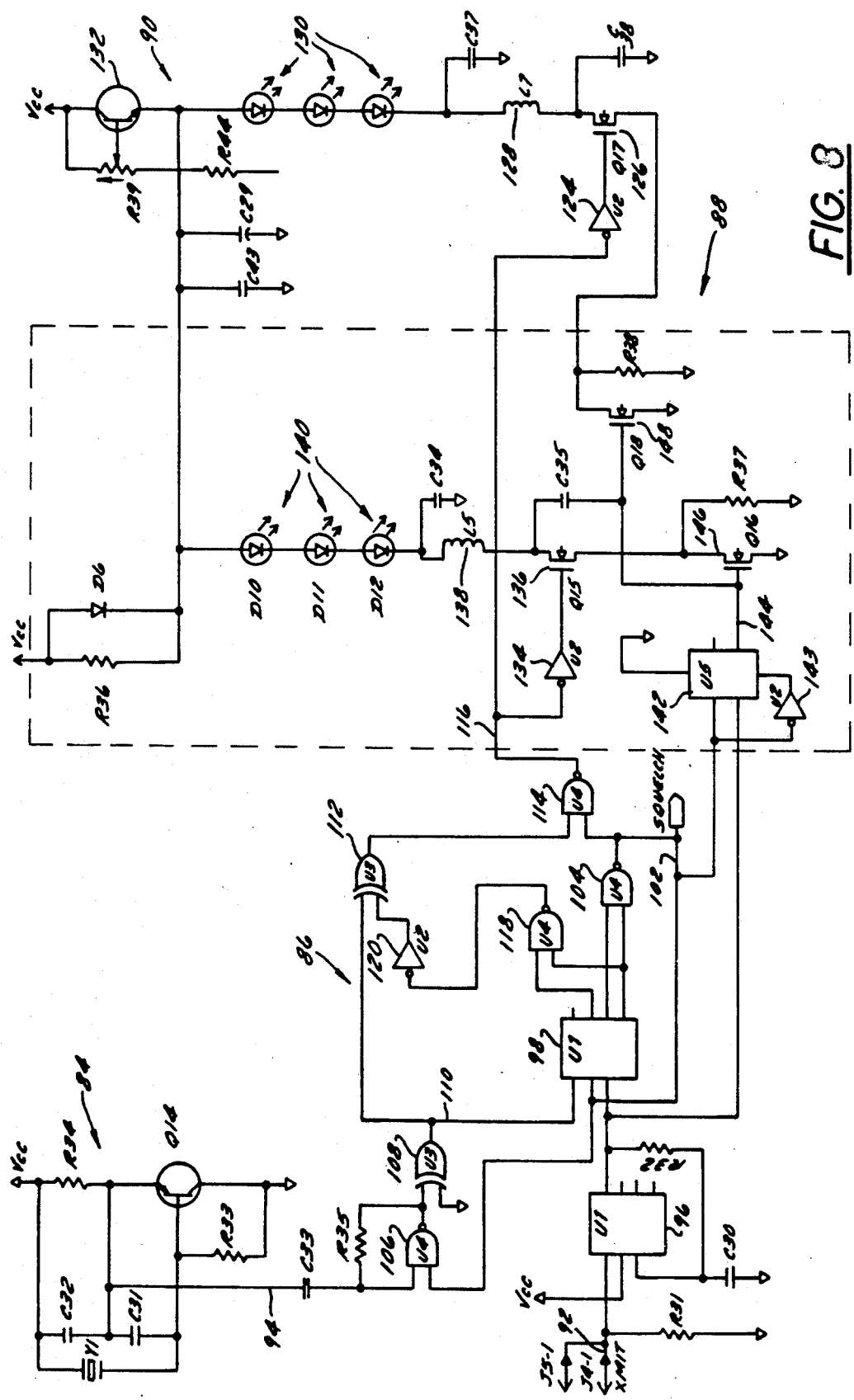
FIG. 3 which includes

FIG. 7 shows a block diagram representation of a preferred embodiment for the construction of the infrared transceivers used in the present invention at both the base and remote stations. The transmitted infrared signals received at an infrared diode stage 70 pass to a filter stage 72. The raw signal received by the IR diode 70 is filtered to the appropriate frequency by the filter 72 and passed to an amplifier stage 74 to step up the signal to provide for optimal detection of the information encoded thereon. The output of the amplifier 74 is connected directly to a detector stage 76, which then detects the information present in the infrared transmission while ignoring the subcarrier frequency. One output of the detector 76 is supplied to an automatic gain control circuitry 78, which via a line 80 connected to the filter 72 completes an automatic gain control feedback system which avoids swamping of the detector stage 76. The second output of the detector 76 is provided via an output line 82 to the appropriate decoder, binary output board or field interface controller.

As shown in the lower portion of FIG. 7, the transmitting stage of the infrared transceiver consists primarily of an oscillator 84, a phase control circuit 86, a power driver stage 88 and an infrared light emitting diode stage 90. In response to a transmit signal on a line 92, the timing control circuitry of phase control stage 86 triggers a one-shot type output pulse having a frequency corresponding to that generated by the oscillator 84. The phase control stage 86 communicates this one-shot pulse to the power driver stage 88 which then steps it up for transmission. The power driver stage 88 applies the stepped-up one-shot pulse to the infrared LED stage 90. The one shot of information then passes as infrared light pulse as an output from the infrared LED stage 90.

Figure 9A:
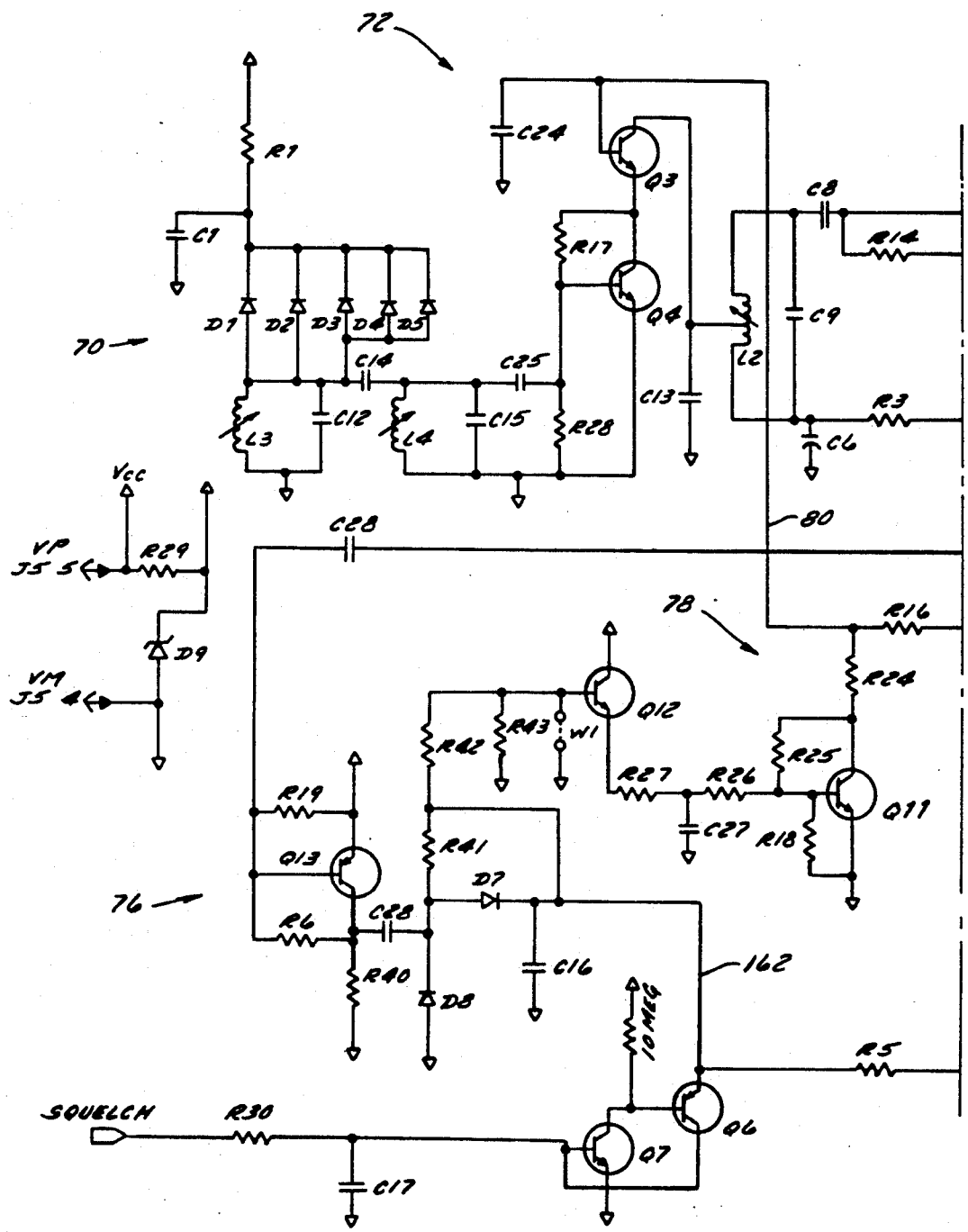
FIGS. 9A–9B, is an electrical schematic diagram of a receiver portion of the infrared transceiver of FIG. 7.
Figure 9B:
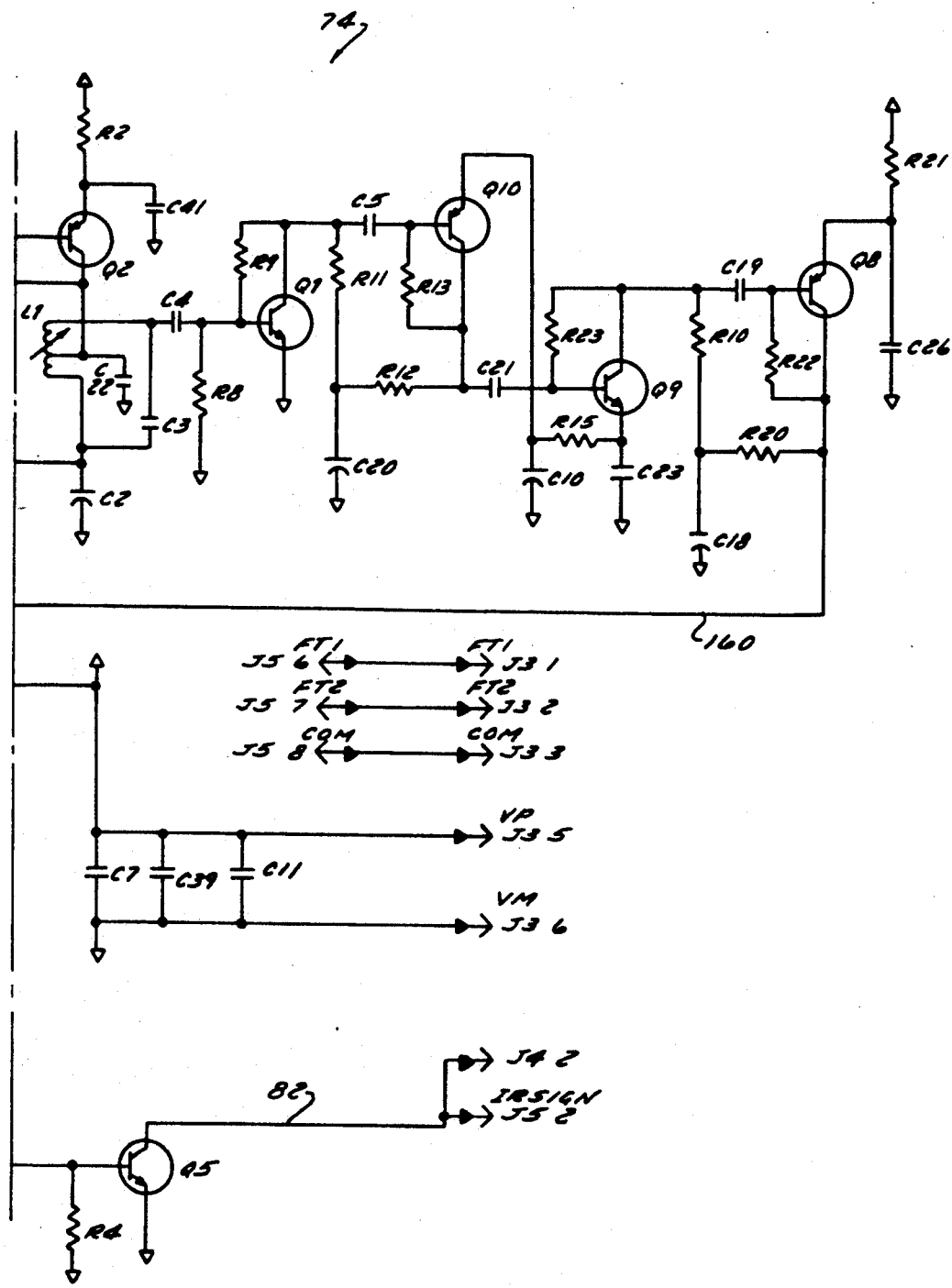

FIGS. 8 and 9 more fully illustrate the specific embodiments of the circuitry utilized for each of the stages illustrated in FIG. 7. FIG. 8 illustrates an electrical schematic of the infrared transmitter portion of the transceiver shown in block diagram form in the lower portion of FIG. 7. FIG. 9 illustrates an electrical schematic for the receiver portion of the infrared transceiver as shown in the upper portion of FIG. 7.

Referring now to FIG. 8, the oscillator circuit 84 supplies a base frequency signal to the timing circuitry of phase control stage 86 which passes a burst of the oscillating signal from oscillator 84 in response to the transmit signal on line 92 on to the power driver stage 88 which then drives the infrared LED stage 90. More particularly, the oscillator stage 84 comprises a resistor Q14, a pair of resistors R33 and R34, two capacitors C31, C32 and a resonator Y1 connected as shown in a Colpits type configuration. Resonator Y1 comprises a ceramic resonator chosen for the desired operating frequency, e.g., 200 kHz., 250 kHz., 300 kHz. or 360 kHz. The oscillator 84 then supplies a single frequency on a line 94 through a capacitor C33 to the timing logic circuitry of the phase control stage 86. Again, the signal on the line 34 will be a sine wave of a frequency determined by selection of the appropriate value for resonator Y1.

Referring now to the phase control circuit 86, receipt of a transmit signal on the input line 92 triggers a one-shot circuit embodied in a counter 96 which resets a second counter 98 via a line 100. A resistor R32 and a capacitor C30 then operate to reset the first counter 96 to await receipt of the next transmit signal on the input line 92. The remaining circuitry in the phase control stage 86 operates to provide eight cycles of transmission of the oscillating frequency on line 94 through to the power driver stage 88. Immediately subsequent to the eight cycles which are allowed to pass, the phase control stage 86 passes two inverted cycles to the power driver stage 88 to help damp the signals in the coils therein.

More particularly, when the counter 98 is reset, the signal on a line 102 goes low as an output of NAND gate 104. This is tied back to the enable input of counter 98 and is supplied as one input to a second NAND gate 106. The other input through NAND gate 106 is the oscillating signal on the line 94. This enables NAND gate 106, which, in conjunction with an XOR gate 108, then passes the signal from line 94 as an output of the XOR gate 108 on a line 110. The line 110 connects to the clock input of counter 98 which then begins counting up in response to the cycles received from the input line 94. The signal on line 110 is also passed through a second XOR gate 112 and a NAND gate 114 to provide an output on a line 116 to the power driver stage 88 for driving the infrared LED stage 90 and transmission of the infrared data.

As shown in FIG. 8, a NAND gate 118 and an inverter 120 operate, for ten cycles of the input signal on line 94, to provide an enabling input to XOR gate 112 which then merely passes the signal on line 110 on to a second line 122. When counter 98 reaches a count of ten, which will provide high signals at outputs Q2 and Q4, NAND gate 118 and inverter 120 operate to provide an inverting signal to XOR gate 112 which then inverts the signal present on line 110 and its output on the second line 122. While the output of NAND gate 104 remains high, the output of NAND gate 114 on line 116 will represent the inverted signal as present on line 122. The signal is processed further by the power driver stage 88. And, for the first ten cycles of the signal on line 94 as impressed on line 110, XOR gate 112 will merely pass the signal on line 110 to the line 122. When the counter 98 reaches the count of ten, XOR gate 112, through the action of the control signals generated by NAND gate 118 and inverter 120, will operate as an inverter for the following two cycles. In this fashion, the residual current in the coils of the power driver stage 88 will be dampened quickly. When counter 98 reaches the count of twelve, the NAND gate 104 will drop low which will disable counter 98 at its enable input, block further transmission of signals from line 122 to line 116 and similarly disable further input of signals from line 94 to line 110. The phase control stage 86 will then be configured to await receipt of a further transmit pulse from line 92 to trigger the one-shot circuitry associated with counter 96.

The output of NAND gate 104 on line 102 is also connected to a squelch circuit as shown which will be described further in conjunction with the receiver portion of the transceiver and in particular in the discussion of FIG. 9 below.

The number of cycles to be transmitted through phase control circuit 86 may of course be chosen for particular applications. Likewise, operation of the present invention does not necessitate the transmission of two inverted cycles to dampen the residual current in the coils of the transmitting portions of the present circuitry. However, the embodiment illustrated in FIG. 8 represents a preferred embodiment of the present invention.

Referring now to the power driver portion 88 of the transmitter circuitry of FIG. 8, the signal on line 116 actually represents an inversion of the signal on line 94. Accordingly, the signal on line 116 passes through an inverter before it controls the operation of the power driver stage 88. The power driver stage 88 in the present embodiment has two configurations, depending upon whether the transmitter is to be used at a base or remote location. If the transmitter is to be used solely at a remote location, the signal on the line 116 passes to an inverter 124, the output of which controls a gate of a FET 126. Switching of the FET 126 provides a path or current through a coil 128. This in turn triggers infrared LEDs 130 of the infrared LED stage 90. Power is provided through a second transistor 132 which may be selectively biased through a potentiometer R39 and a resistor R44 connected at its base terminal. The values of capacitor A (C37) and capacitor B (C38) should be chosen to optimize LED transmission of a signal having a frequency determined by the resonator Y1 and oscillator circuit 84. For example, for an output signal of 250 kHz., resonator Y1 may be a CSB250D, capacitor A (C37) may be a 0.82 microfarad and capacitor B (C38) may be a 0.22 microfarad.

Alternatively, if the infrared transmitter is to be utilized at the base station in the present system, further circuitry is provided in the power driver stage 88 to accommodate the lengthier pulses anticipated, particularly that of a clear pulse which may have a duration approximately four times greater than that of other pulses to be transmitted. Again, the signal on the line 116 passes to an inverter 134 which controls an FET 136 at its gate. The FET 136 provides a current path for a coil 138 which in conjunction with capacitor A (C34) and capacitor B (C35) provides a current path for series infrared LEDs 140 in conjunction with a diode D6 and a resistor R36. When a transistor 146 is on, the current path is completed from its drain to its source at ground. However, when the transistor 146 is switched off, the current path is completed through a resistor R37. Because of the higher value of the alternate path resistor R37 compared to the effective "on" resistance of the transistor 146, the effective power output is diminished. This may become important during transmission of pulses of longer duration which may be recognized even though they have lower output compared to pulses of a shorter duration which are less easily recognized by receivers.

In the base transmitter, a flip-flop 142 is further included. The output of the NAND gate 104 on the line 102 represents the D input to this flip-flop. An inverter 143 supplies the signal as inverted to the reset input of the flip-flop 142. The one-shot counter 96 supplies the C input to the flip-flop 142 via the line 100. Accordingly, if counter 96 supplies a second reset pulse to counter 98 prior to the termination of the high signal on line 102, which represents the period of transmission of a normal pulse envelope, that will identify it as a longer duration pulse. As mentioned above, it is desirable during such pulses to reduce the power output from the power driver stage 88. Accordingly, the flip-flop 142 operates to pass a low signal at its $\overline{Q}$ output 144 which is then transmitted to the gates of two FET transistors 146 and 148. This turns off these transistors and forces the current through the higher value resistors R37 or R38, respectively, thereby decreasing the current and the power through the infrared LEDs 140 or 130.

Although the transmitter is shown in FIG. 8 in terms of a preferred embodiment, it will be appreciated by those skilled in the art that a number of other configurations would work equally well in the system of the present invention. For example, depending upon the particular design parameters of a control system utilizing the present invention, pulse envelopes of a longer duration may be desired. Such modification may be readily accomplished by changing the control output from the counter 98 of FIG. 8. Alternatively, similar configurations, such as flip-flop 142 in FIG. 8, may be used to reconfigure the power driving circuits in the infrared LED display for transmission circuits.

Referring now to FIG. 9, therein is shown an electrical schematic diagram of the receiver portion of the transceiver previously illustrated in block diagram form in FIG. 7. Generally, the infrared diode stage 70 passes the received frequency signals through the filter 72 on to amplifier stage 74 which amplifies the signal sufficiently for processing in the detector stage 76. To insure that signal stays within defined processing limits, the automatic gain control stage 78 feeds back via line 80 to filter stage 72. The output of the circuit on line 82 represents the infrared signal which is passed to the FIC or the protocol decoder board depending upon whether the receiver is at the base or the remote field point.

More particularly, the transmitted infrared information is received at the IR diode stage 70. As illustrated in FIG. 9, the IR diode stage 70 comprises a plurality of infrared sensing diodes D1, D2, D3, D4 and D5 in conjunction with a resistor R1 and a capacitor C1. The diodes of stage 70 operate as a tuned rectifier in conjunction with tuned coils L3 and L4 and capacitors C12, C14, C15 and C25. The output of stage 70 may then be passed across resistor R28 and supplied to the base of transistor Q4 in filter stage 72. The filter stage 72 comprises transistors Q2, Q3 and Q4 in conjunction with resistors R17, R28, R14, R3 and R2. Capacitors C24, C13, C9, C6, C8, C2, C3, C22, C41, C4 in conjunction with tuned coils L1 and L2 provide the desired filtering characteristics for filter stage 72. In this fashion, high frequency infrared signals received at the IR diode stage 70 may be further filtered to obtain the desired frequency at the output of filter stage 72 across resistor R8. Accordingly, the receiver illustrated in FIG. 9 may be made relatively immune to undesirable infrared radiation but remain highly responsive to the transmitted high frequency IR envelope pulses.

The amplifier stage 74 comprises a tuned amplifier of transistors Q1, Q10, Q9 and Q8 in conjunction with resistors R21, R22, R10, R20, R15, R23, R13, R12, R11 and R9 and capacitors C5, C20, C21, C10, C23, C19, C18 and C26. In the preferred embodiment illustrated in FIG. 9, the tuned amplifier of amplifier stage 74 desirably provides about 80 db. of gain to the signal which it outputs on a line 160 to the detector stage 76.

The detector stage 76 receives the filtered and amplified high frequency infrared signal through a coupling capacitor C28 at the base of a transistor Q13. The detector stage comprises a diode rectifier and a capacitor filter which is designed to filter the subcarrier frequency of the infrared information, but still be responsive to incoming signals as short as 60 microseconds. As illustrated in FIG. 9, detector stage 76 comprises the transistor Q13, resistors R19, R6, R40 and R41, diodes D7 and D8 and capacitors C28 and C16. The output signal on a line 162 then passes to transistor Q5 which in conjunction with resistors R5 and R4 buffers the signal for output as "IR SIGN" on a line 82.

The output of the detector stage 76 is supplied through resistor R42 to the base of the transistor Q12 which acts as a peak detector with the charge being held by capacitor C27. In this fashion, resistors R43, R27, R26, R25, R18, R24, R16 in conjunction with transistors Q12 and Q11 and capacitors C27, C7, C39 and C11 operate as automatic gain control circuit 78. The automatic gain control signal on line 80 is then fed back to the filter stage 72 at transistor Q3. Capacitor C27 acts to delay the peak detection to accommodate receiver delays.

FIG. 9 also illustrates squelch control circuitry comprised of transistors Q6 and Q7 in conjunction with a resistor R30 and a ten mega-ohm resistor connected at the base of a transistor Q6 and a capacitor C17. As shown in FIG. 8, the output of NAND gate 104 on line 102 may be tapped to provide squelch control when the transceiver is transmitting an infrared pulse envelope. As explained in conjunction with FIG. 8, the signal on line 102 will be high during infrared transmission. Correspondingly, a high signal squelch input to the receiver section on a line 164 will tie the signal on the line 162 to ground effectively squelching any output from the receiver section. This ensures that a transmitter will not interfere with its own receiver.

To further facilitate the function of the receiver in the present system, the infrared diode detection circuit 70 utilizes galium arsonide IR diodes. These are physically located inside a window to require that the IR signal from the base or remote unit pass through a window of an IR filter material. The light filter placed in front of these diodes is designed to pass light at 950 nanometers and aids in preventing visible light from interfering with IR communications. In the preferred embodiment, the IR diode stage is designed to be optimized for four electronically filtered subcarrier transmission frequencies, e.g., 200 kHz., 250 kHz, 300 kHz, and 360 kHz.

Because the automatic gain control circuitry 78 interfaces with the filter stage 72 of transistor Q3, it is able to effect the gain of both stages of the filter. In this fashion, approximately 80 db. of dynamic range may be provided for the AGC.

The four cascaded transistor gain stages of the amplifier 74 desirably provide about 80 db. of gain above 200 kHz. In the preferred embodiment, each stage is biased at 1.8 volts to provide an output signal from the section of about 0.5 to 1.0 volts in response to an IR excitation at the input. Transistor Q8 and associated resistors provide a voltage gain stage in order to increase the signal for the diode detection in detector stage 76.

With the exception of those portions of the circuit noted as being unique to the base station transceiver, the circuitry for both the base station and the remote field point transceivers are identical. Each represents a finely tuned, low-power device to optimize reception in a potentially noisy environment without adding unnecessarily to the cost of the system.

Referring now to FIG. 10, therein is shown a block diagram representation of the major elements of the protocol decoder for use in decoding the infrared signals at various of the remote field points. As shown, a clear detect stage 200 receives infrared information on a line 202 from the remote infrared transceiver (not shown). The clear detect circuit 200 then provides appropriate signals to a query decode stage 204, a force change of state decode stage 206 and an address decode stage 208. As discussed below in more detail, each communication transaction between the base and the remote points in the envisioned system begins with a predefined clear pulse which must be decoded by the clear detect stage 200 before further information processing or communication may take place. Once the clear pulse has been detected by the circuit 200, the output of the clear detect circuit 200 on a line 210 to the query decode stage 204, the force change of state decode 206 and the address decode stage 208 enables each of those stages to provide a second layer of decoding in response to infrared information then shunted around the clear detect stage 200 on a line 212 and received by each of the second layer stages.

Because of the importance of the clear pulse in the envisioned information protocol, clear detect stage 200 provides the timing for the decoder system. For this reason, the clear detect circuit 200 functions asynchronously from the rest of the decoder system.

The end detect circuitry 214 detects and decodes a unique end pulse which is transmitted by the point card coincident with the last data pulse on a line 216. Detection of the end pulse sets a line 218 high which as communicated to the query decode circuitry 204 reconfigures that circuitry to look for an acknowledge pulse to be received on the IR input from the base station. When the query decode circuitry 204 decodes the acknowledge pulse received on the line 212 and passes on an acknowledgment pulse to the point board on a line 220 which operates as described below. This same signal on the line 220 resets the end detect circuitry 214. Similarly, detection of a clear pulse on line 202 by the clear detect circuitry 204 releases the latch signal on 218 as an output of the end detect block 214.

The query decode circuit 204 receives the clear detection enabling signal on a line 210, input infrared information on a line 212 and the end detect signal on the line 218. The query decode block 204 also receives a change of state signal from its associated point board on a line 222. Similarly, the query decode block 204 receives a force change of state output on a line 224. Query decode circuit 204 operates to decode infrared pulse in a specific time slot occurring on input line 212. When the circuit 204 decodes the predefined query pulse from line 212, it checks to see whether a change of state signal is present on line 222 or a forced change of state signal is present on line 224. If either of these two signals is present, query decode block 204 sends a signal on a line 226 to the address decode block 208 for further processing. In response to these same conditions, query decode block 204 sends a signal on a line 228 to the point board to latch it high for subsequent transmission of the information present there. As always, query decode block 204 operates only after a clear detect signal becomes present on line 210. Query decode block 204 also operates to decode the acknowledge signal received on line 212 whenever an end detect signal is present on line 218. As mentioned before, when the end detect signal is present on line 218 and an acknowledge pulse is decoded from input line 212, the circuit 204 impresses a signal on a line 220 to the point board to reset it for further information gathering or transmission.

Whenever the base station desires to have each of its associated remote points report their status, it transmits a unique force change of state signal subsequent to a clear signal. Accordingly, in the circuit of FIG. 10, the clear detect circuit 200 detects the clear pulse received on the line 202 and sends a clear detected signal on line 210. This signal enables the force change of state decode circuit 206 which then subsequently decodes the after-occurring force change of state pulse from the input line 212. Once the circuit 206 decodes the force change of state pulse, the circuit 206 impresses a signal on the line 224 to the query decode circuit 204 to enable it to decode the next query pulse from the base unit and to enter the appropriate queue to transmit the associated point information. Once the communication of the appropriate information has been completed, the acknowledge signal which occurs on the line 220 resets the force change of state decode circuit 206 by impressing a corresponding signal on a line 230.

The address decode block operates in response to the other circuits illustrated in FIG. 10. As always, the address decode circuit 208 remains disabled until the initializing clear pulse is received or is detected by the clear detect circuit 200 and a corresponding signal impressed on the line 210. Subsequently, the address decode circuit 208 receives the input infrared signals on the line 212. When the query decode circuit 204 has detected a query pulse or forced change of state decode circuit 206 has detected a forced change of state pulse, the high output signal on the line 226 from the query decode circuit 204 to address decode circuit 208 causes address decode circuit 208 to output the point address on a line 232 at the appropriate time following the query pulse. When the address decode circuit 208 subsequently decodes the point's address as transmitted by the base and received in the line 212, it passes a decoded address pulse through as a "request" pulse on a line 234 to the point board to initiate the transmission of the information, status or data present at the point board. When the address decode circuit 208 decodes the point's address as transmitted by the base and received on the line 212, but has not yet received an enter-queue signal on the line 226 from the query decode circuit 204, it must respond to the address pulse from the base and accordingly output a poll response pulse on a line 236 which is then transmitted to the base at an appropriate time to indicate that the point is still active and has responded to the polling address pulse.

Figure 11A:
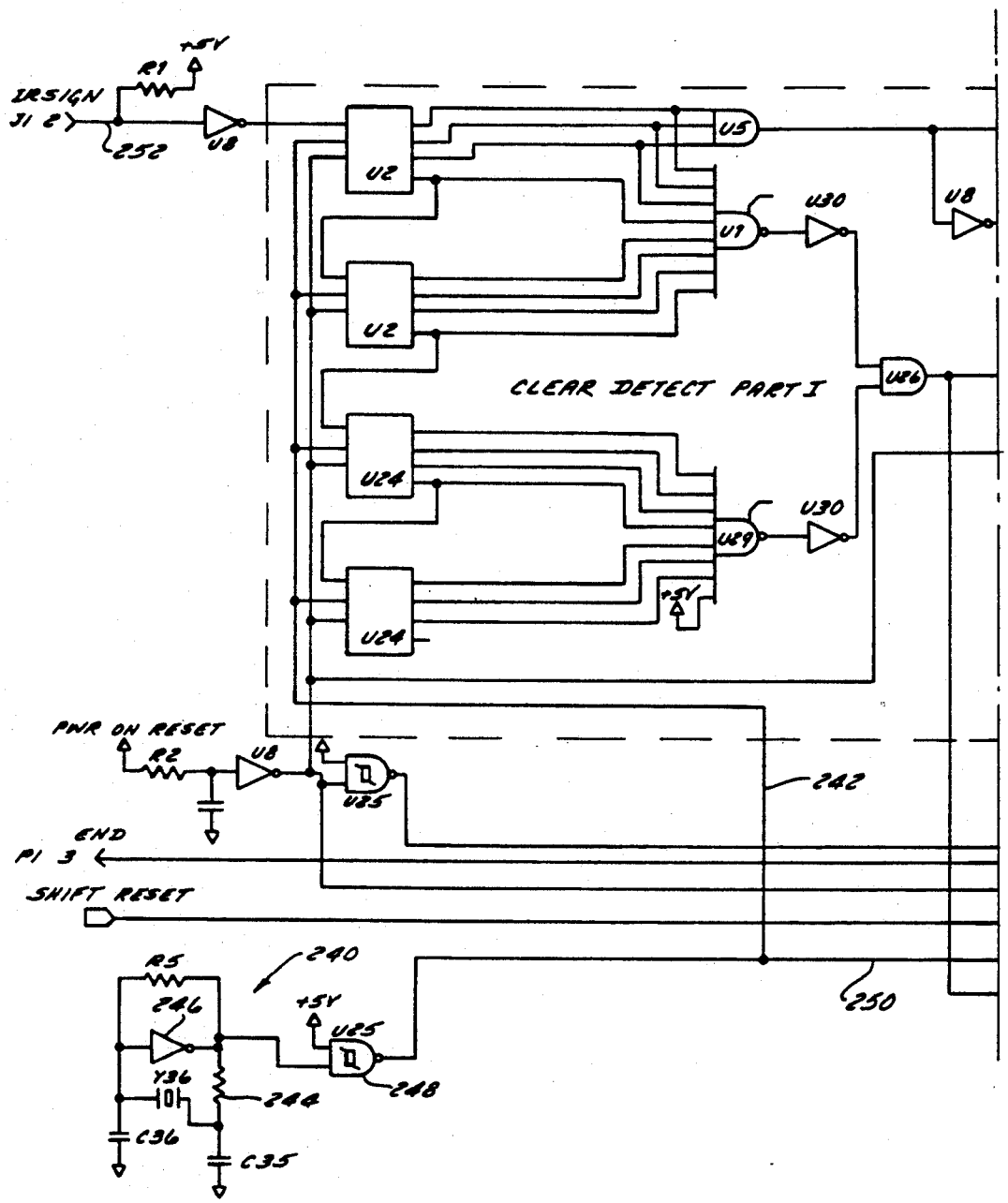
FIGS. 11A–11B, is an electrical schematic of one portion of the protocol decoder of FIG. 10.
Figure 11B:
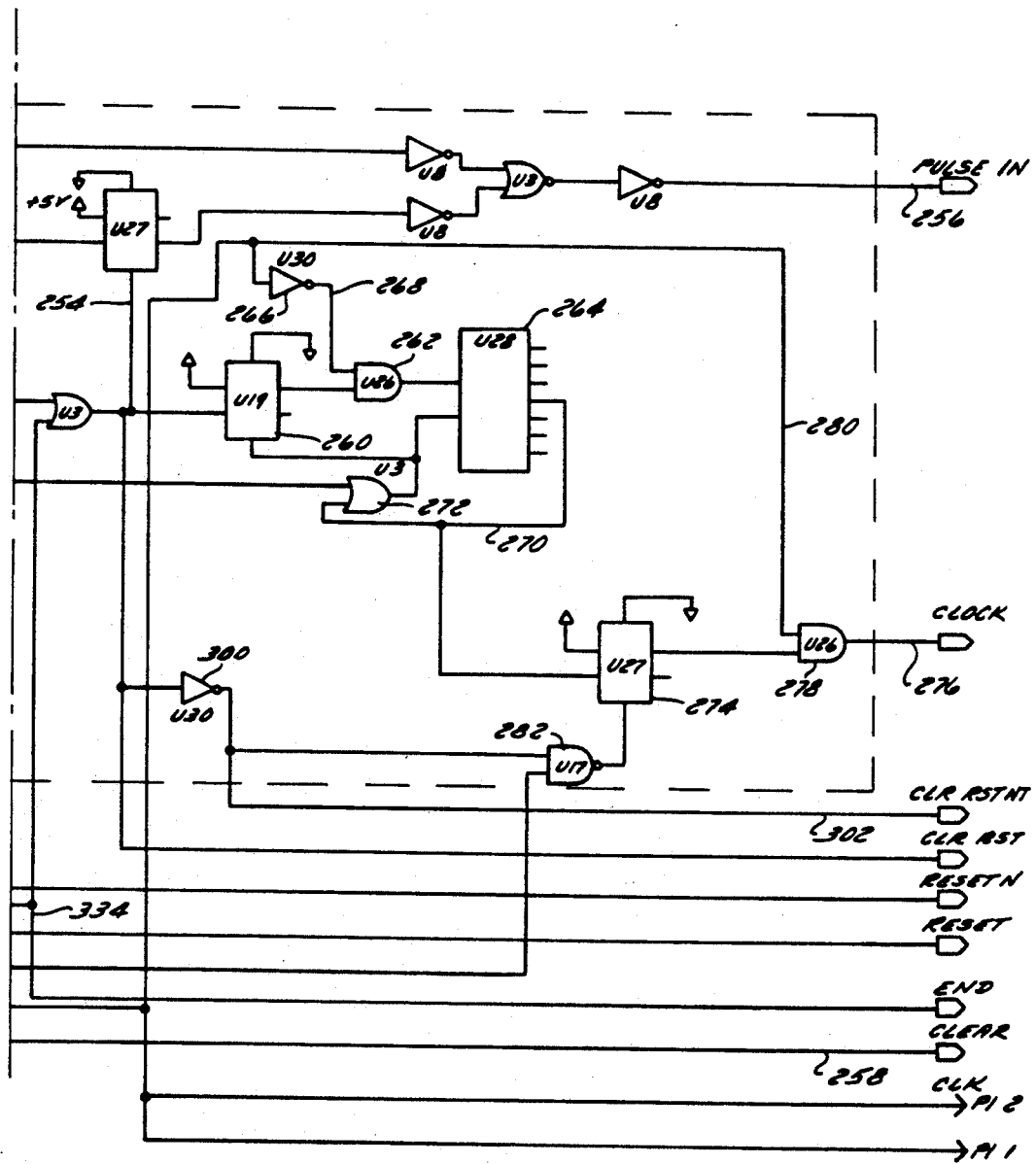

Referring now to FIG. 11, therein is shown a first schematic representation of one portion of the clear detect circuitry used in the protocol decoder circuitry of FIG. 10. In particular, in the lower left hand corner, timing circuitry 240 provides a 64 kHz. clock signal on a line 242 to the clear detect circuitry. As shown, clock circuitry 240 comprises a 64 kHz. resonator in conjunction with resistor R5, second resistor 244, inverter gate 246 and capacitors C36 and C35. A NAND gate 248 inverts and buffers the output signal of the clock to the line 242. This clock signal is also supplied on a line 250 to provide additional clock inputs to other portions of the decoder circuitry.

In conjunction with two shift registers, U2 and U24, the 64 kHz. clock signal on the line 242 samples the IR input signal received on a line 252 at the 64 kHz. rate. These samples are then stored in the two shift registers U22 and U24. Whenever thirteen consecutive samples display a logic high signal, a clear pulse is identified. In the preferred embodiment, the thirteen consecutive samples comprise a two hundred thirty-four (234) microsecond time period. NAND gates U1 and U29 decode the clear signal in conjunction with AND gate U26 and OR gate U3 to reset the input latch flip-flop U27 via a signal on a line 254. A second pulse may then be received from the base station and processed as an output on a line 256. However, when a second pulse is received from the base station, the latch U27 becomes set to block further pulses until an additional clear signal is decoded and the latch reset via a signal on line 254. When a clear pulse is decoded, a high-output signal is presented on a clear line 258 to further circuitry in the decoder. Also, through the action of a flip-flop 260 and an NAND gate 262, decoding a clear pulse and presenting a high clear signal on a line 254 enables the clock input to a delay counter 264 which receives the 64 kHz. clock signal via an inverter 266 on a line 268.

The counter 264 operates to initiate a one hundred twenty-five (125) microsecond delay corresponding to a count of eight. The count of eight impressed on a line 270 resets the counter 264 through the action of an OR gate 272, and also resets the flip-flop 260 to await a further clear pulse detection.

The signal on the line 270 also sets a flip-flop 274 to enable the clock output on a line 276 as an output from NAND gate 278. The NAND gate 278 receives the 64 kHz. clock signal on a line 280 as its other input. NAND gate 282 operates to reset flip-flop 274 and disable the clock output on the line 276 when the appropriate reset conditions are detected.

Effectively, the one hundred twenty-five (125) microsecond delay, introduced into the signal processing by counter 264, provides a margin of error for subsequently received infrared pulses. In this fashion, infrared delays may be tolerated without upsetting the pulse position modulation utilized in the preferred communication protocol for the present invention.

Figure 12A:
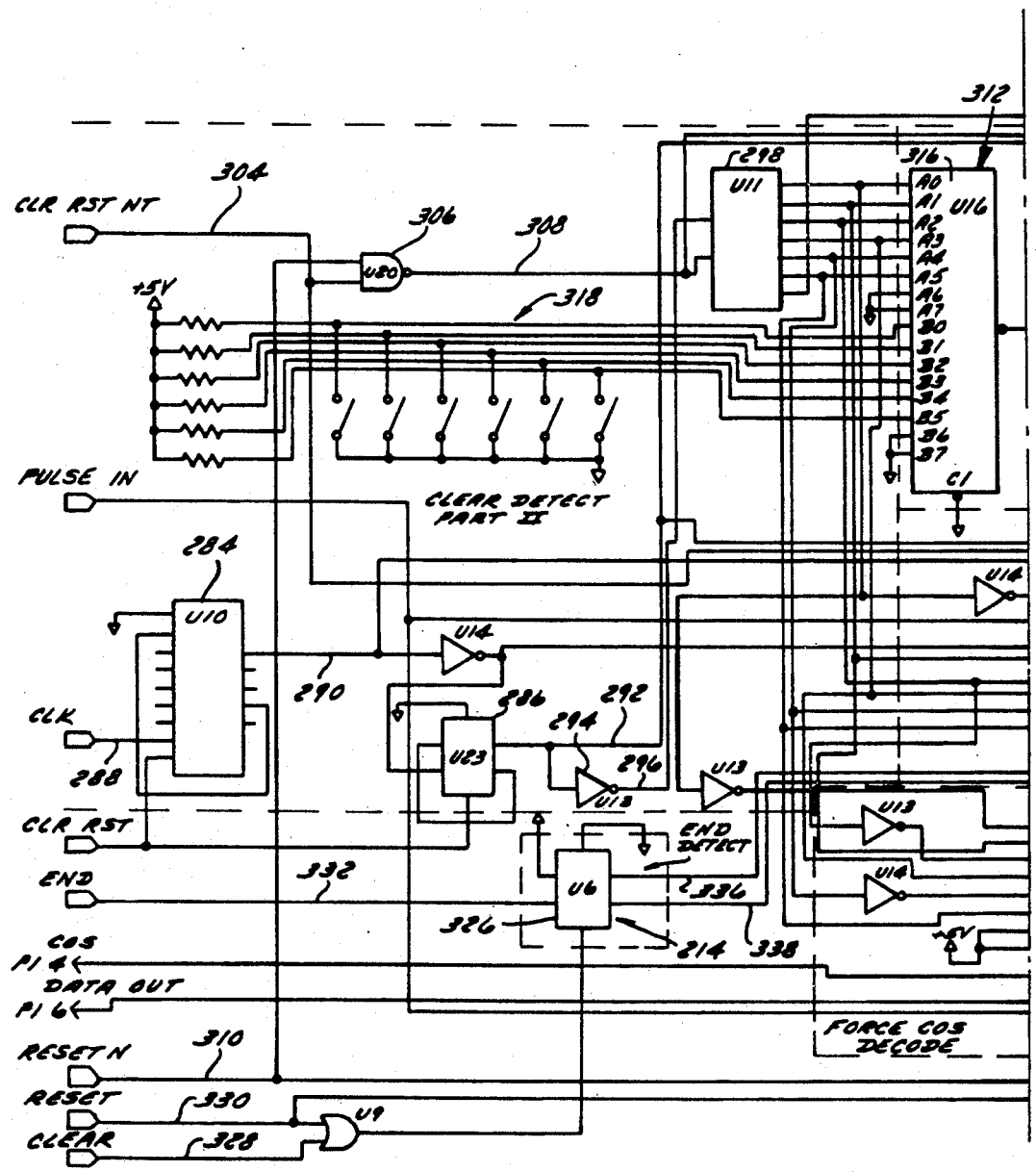
Figure 12B:
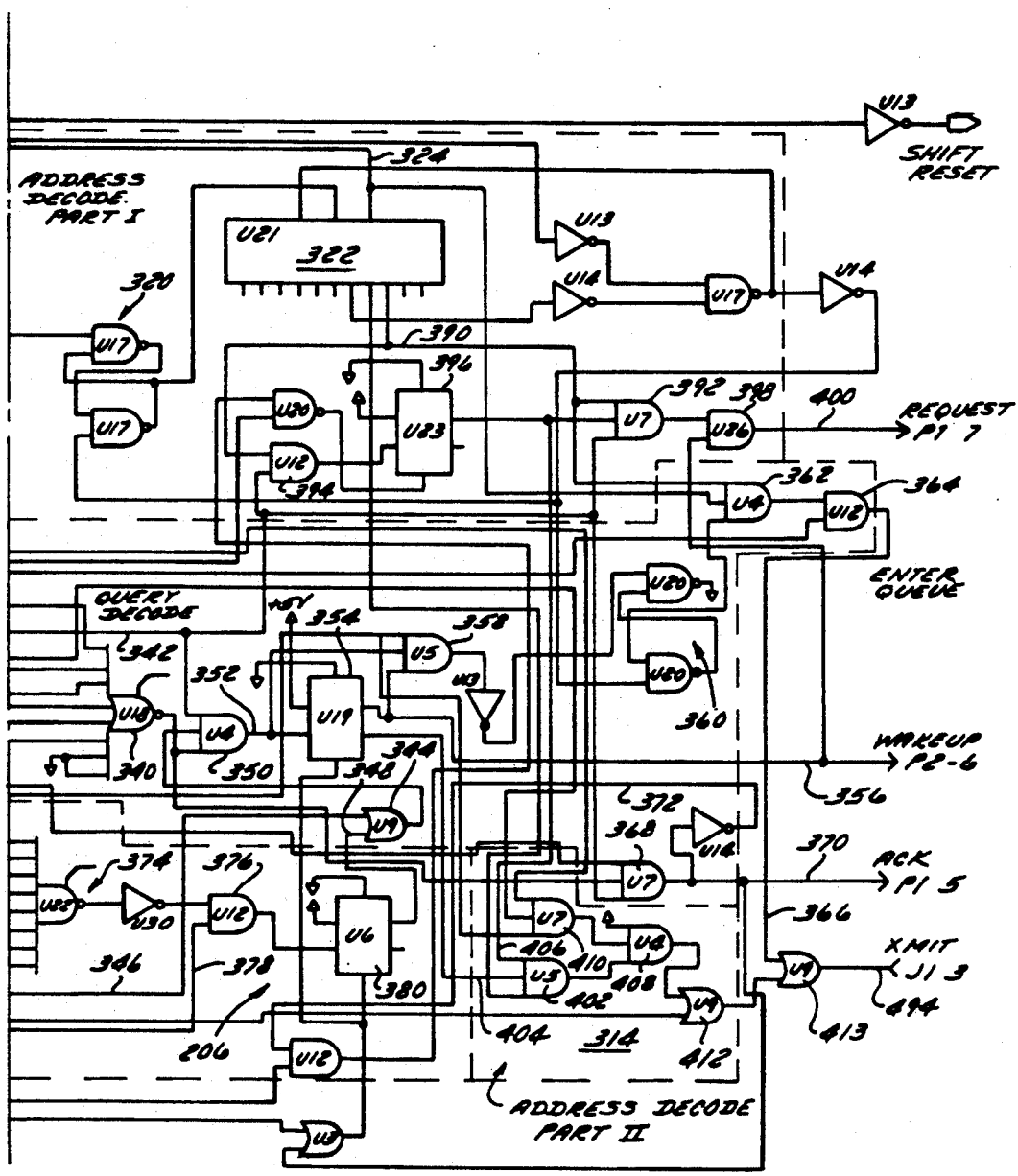

Referring now to FIG. 12, therein is shown the remainder of the clear detect circuitry. In this figure, the clear detect circuitry further comprises frequency dividers 284 and 286 which divide the sixty-four (64) kHz. delayed clock signal received on a line 288 (corresponding to the line 276 from FIG. 12) down to an 8 kHz. signal on a line 290 at the output of divider 284 and further to a four (4) kHz. signal on a line 292 at the output of the second divider 286. An inverted four (4) kHz. clock signal appears at the output of the inverter 294 on a line 296 which is supplied as a clock input to a counter 298. The counter 298 had been previously reset by the detection of a clear pulse by the first portion of the clear detect circuitry illustrated in FIG. 11. The signal on the line 254 is inverted at an inverter gate 300 which provides a low signal to an output line 302 which communicates directly with an input line 304 in FIG. 12. A low signal at the input to an AND gate 306 impresses a high reset signal on a line 308 to the reset input of the counter 298. Other appropriate reset conditions may cause a similar reset signal to appear on a line 310. Accordingly, the counter 298 counts up from zero in response to each four kHz. pulse received on the line 296 at its clock input. Each four kHz. pulse corresponds to a two hundred fifty (250) microsecond address window for detection of the appropriate field point address, as the counter 298 then supplies its output address count to a first portion 312 of the address decode circuitry 208.

In the preferred embodiment of the present invention, address pulses have a duration of approximately 62.5 microseconds. Accordingly, the use of a two hundred fifty (250) microsecond wide address window as supplied by the counter 298 provides for considerable leeway in the time of occurrence of the address pulse. Although the desired occurrence of the pulse is in the interval between 62.5 microseconds and 125 microseconds after the initiation of the address window, the pulse may occur up to 62.5 microseconds early from the desired time or 125 microseconds later than the desired time and still fall within the appropriate address window and be correctly decoded.

Generally, the address decode circuitry 208 as illustrated in FIG. 12 consists of a first portion 312 and a second portion 314. An address comparator 316 receives the address signals from the output of the address counter 298. It compares this to a particular field point address as encoded by a six position DIP switch 318. When the address count from the counter 298 corresponds to the encoded address from the DIP switch 318, the output of address comparator 316 drops low to set a flip-flop 320. This enables a second counter 322 which increments immediately to a count of one. On the next rising edge of the four kHz. clock signal received on a line 324, the counter 322 will reach a count of two which corresponds to the address window for the point in question. To accomplish this, the address window for the point actually must be the address plus one count on the address window counter 298. Further explanation of the address decode circuitry requires explanation of the other functional blocks in the protocol decoder board.

Referring now to end detect circuitry 214, as illustrated in FIG. 12, a flip-flop 326 is responsive to reset signals received at its reset input from a reset input line 330 or a clear line 328. The flip-flop or latch 326 responds to input signals received on a line 332 subsequent to a reset pulse on the line 330 or a clear pulse on the line 328. When a pulse is received on the line 332, the Q output of flip-flop 326 goes high a line 336 and the not-Q output of the flip-flop 326 goes low on a line 338. The signals then reconfigure the query decode circuit 204 to cause it to look for an acknowledge pulse occurring within the designated interval subsequent to the detection to the end pulse on the line 332.

As illustrated in FIG. 12, query decode circuitry 204 decodes the address of the query pulse at a NOR gate 340 which receives the selected outputs from the address window counter 298. The output of the NXOR gate 340 becomes one input to an AND gate 350. The AND gate 350 receives as another of its inputs the infrared pulse input information on a line 342. The third and final input to the AND gate 350 is received from an OR gate 344. The OR gate 344 exhibits a high output signal to the AND gate 350 when a change of state signal has been received from the point board via a line 346 or a forced change of state signal has been received from the forced change of state decode circuitry 206 via a line 348. Thus, when a pulse occurs in the query address window as decoded by OR gate 340 and a forced change of state or a change of state signal is also present, the output of the AND gate 350 goes high on a line 352 which sets a change of state latch 354. This impresses a high signal on an output line 356 which acts as a "wake-up" signal to the associated point board. This same signal becomes one input to an AND gate 358. The second input to an AND gate 358 is the high output signal on the line 352 from the AND gate 350. The third and final output to the AND gate 358 is the output of the NOR gate 340. Thus, the AND gate 358 displays a slightly delayed high output signal which is inverted to set a flip-flop 360.

The Q output of the flip-flop 360 forms one input to an AND gate 362. The other two inputs to an AND gate 362 comprise a high signal for the output of the counter 322 and the clock input on the line 324. Thus, the output of the AND gate 360 goes high on the rising edge of the next four kHz. pulse.

The output of the AND gate 362 is tied as one input to an AND gate 364. The enabling input to the AND gate 364 is an eight kHz. clock signal from the line 290. Thus, the output of the AND gate 364 on a line 366, which represents the "enter queue" signal, goes high on the next occurring eight kHz. clock pulse, which causes the protocol decoder board to exhibit an "enter queue" signal in its address window subsequent to the next query pulse.

The remaining portions of the query decode circuitry comprise an AND gate 368 which receives as one input the infrared pulse-in information from the line 342. The second input to the AND gate 368 is the Q output of the end detect latch 326. The third and final input to the AND gate 368 is the output of the NOR gate 340. Thus, when the end detect latch 326 goes high indicating that an end signal has been detected, the AND gate 368 becomes enabled at one input. The NOR gate 340 then provides the second enabling input in the first address window occurring subsequent to detection of the end pulse. Thus, the AND gate 368 looks for an acknowledge pulse from the base transmitter on the line 342. When this occurs, the output of the AND gate 368 on a line 370 goes high. This signal is provided to the point board to reset the point board. The same signal is also inverted to provide a low signal on a line 372 which provides a reset input to the change of state and force change of state circuitry to allow the query decode circuit to again look for a query pulse.

As illustrated in FIG. 12, the force change of state decode circuitry 206 comprises a first logic section 374 which is responsive to the outputs of the address counter 298 to decode the desired, unique force change of state address. During this forced change of state address window, the first input to an AND gate 376 goes high. Thus, when the second input to the AND gate 376, which is the infrared information-in signal on the line 342, goes high, the output of the AND gate 376 goes high which sets a forced change of state latch 380. This drives the Q output of the latch 380 high which provides a signal on the line 348 at OR gate 344, which then operates as described above in conjunction with AND gate 350 to ultimately cause the remote point to enter the next occurring query sequence.

Returning to the address decode circuitry, as previously mentioned, the output of the counter 322 goes high on the first clock pulse subsequent to the address window on a line 390. This enables an AND gate 392 at one input. It also enables a second AND gate 394 which receives as its other input the infrared pulse-in information from the line 342. Thus, when an infrared pulse occurs in the address window as indicated by the counter 322, the output of the AND gate 394 goes high which sets address latch 396. The Q output of the latch 396 goes high as a second input to the AND gate 392. The third and final output to the AND gate 392 is again the infrared information-in pulse on the line 342. The output of the AND gate 392 then supplies a high enabling pulse to another AND gate 398. The second and final input to the AND gate 398 is the signal from the line 356. This signal will be high whenever a change of state, or forced change of state, signal is present at the time of the query pulse decode. This then provides a high "request" on a line 400 to the point board to begin transmission of the information stored there.

The second portion 314 of the address decode circuitry is illustrated in the lower right hand portion of FIG. 12. Generally, this circuitry comprises an AND gate 402 which receives a first input on a line 404 which is the Q bar output of the query decode latch 354. This signal will be high until such time as the query pulse has been decoded. The second input to the AND gate 402 is the Q output of the address decode latch 396, which will be high when the pulse has occurred in the point board address window. The final input to the AND gate 402 is a third output of the counter 322 which will increment high on the next clock pulse occurring on the line 324. Thus, on the clock pulse subsequent to the point address window, the output of the AND gate 402 will go high to provide a first enabling input to another AND gate 408. The AND gate 408 receives its other input from an AND gate 410. The AND gate 410 operates to decode the four kHz. clock pulses from the line 292, inverted clock pulses from the line 290 and the output of the exclusive NOR gate 340 to provide a delayed output signal to an OR gate 412 and then to a second OR gate 413 to impress a high output signal on the line 414. Thus, when a poll signal is transmitted by the base station in the point board's address window as detected by the address decode block and a query pulse has not been detected by the query decode circuitry, the point must send a responsive pulse in the next occurring address window which is provided by the incremented count from the counter 322.

Figure 13:
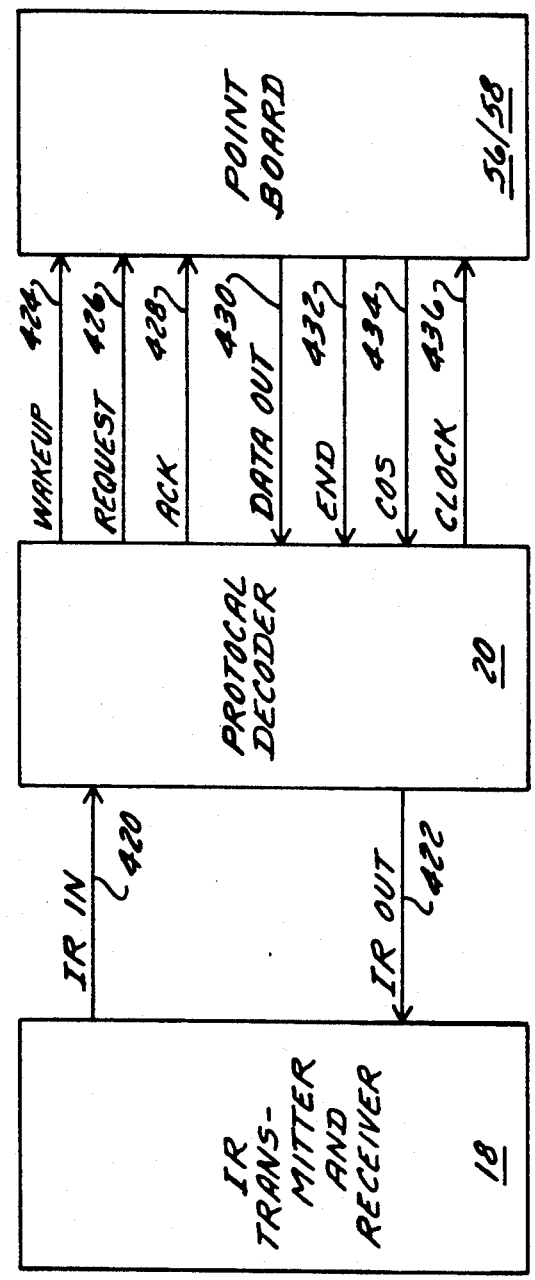
FIG. 13 is a block diagram representing signal transfers at the various remote field points in conjunction with the present invention.

Referring now to FIG. 13, this block-type diagram illustrates the interrelation between the protocol decoder 20 (discussed in detail above), the infrared transmitter and receiver 18 (discussed in detail above), and the point board 56/58 (discussed in detail below), for use in the system according to the present invention when the point board is not binary output board.

Specifically, the infrared transmitter and receiver 18 receives infrared signals from the base station transceiver and provides these signals on a line 420 to the protocol decoder 20. Protocal decoder 20 receives information from the point board 56/58 and sends it in as an output signal on a line 422 to the IR transceiver 18 for transmission to the base station.

The protocol decoder 20 communicates with the point board 56/58 via the seven lines illustrated. Specifically, in response to change of state or forced change of state information, protocol decoder 20 provides a "wake up" signal on a line 424 to the point board 56/58. Similarly, when the remote point is addressed by the base transceiver for transmitting the information concerning that point, the protocol decoder 20 passes the request pulse on a line 426 to the point board 56/58 to initiate the transfer of data. At the conclusion of data transmission and the communication sequence between the base and the point, the protocol decoder 20 decodes an acknowledge signal from the base station and passes it on a line 428 to the point board 56/58 to reset the point board for further, subsequent transmissions.

The point board 56/58 provides a number of signals also to the protocol decoder 20. In response to a request pulse on the line 426, the point board 56/58 provides a data output signal on a line 430 to the protocol decoder 20, and thus to the infrared transceiver 18 for transmission to the base station. Simultaneously with the last data pulse for transmission, the point board transmits an end signal on a line 432 to the protocol decoder 20. As mentioned above, the end signal reconfigures the protocol decoder 20 to look for an acknowledge signal from the base station rather than the query signal. Also, the point board 56/58 must provide the protocol decoder 20 with change of state information which it does by way of a change-of-state (COS) signal on a line 434 which communicates to the protocol decoder 20 that it should enter the next occurring query sequence to initiate transfer of the information to the base station.

As explained more fully elsewhere, the protocol decoder board 20 provides a clocking signal via a line 436 to the point board 56/58. This ensures that the point board operates on the same sequence as the remaining circuitry in the present, preferred embodiment, which relies upon the spacing of the pulse signals.

Figure 14A:
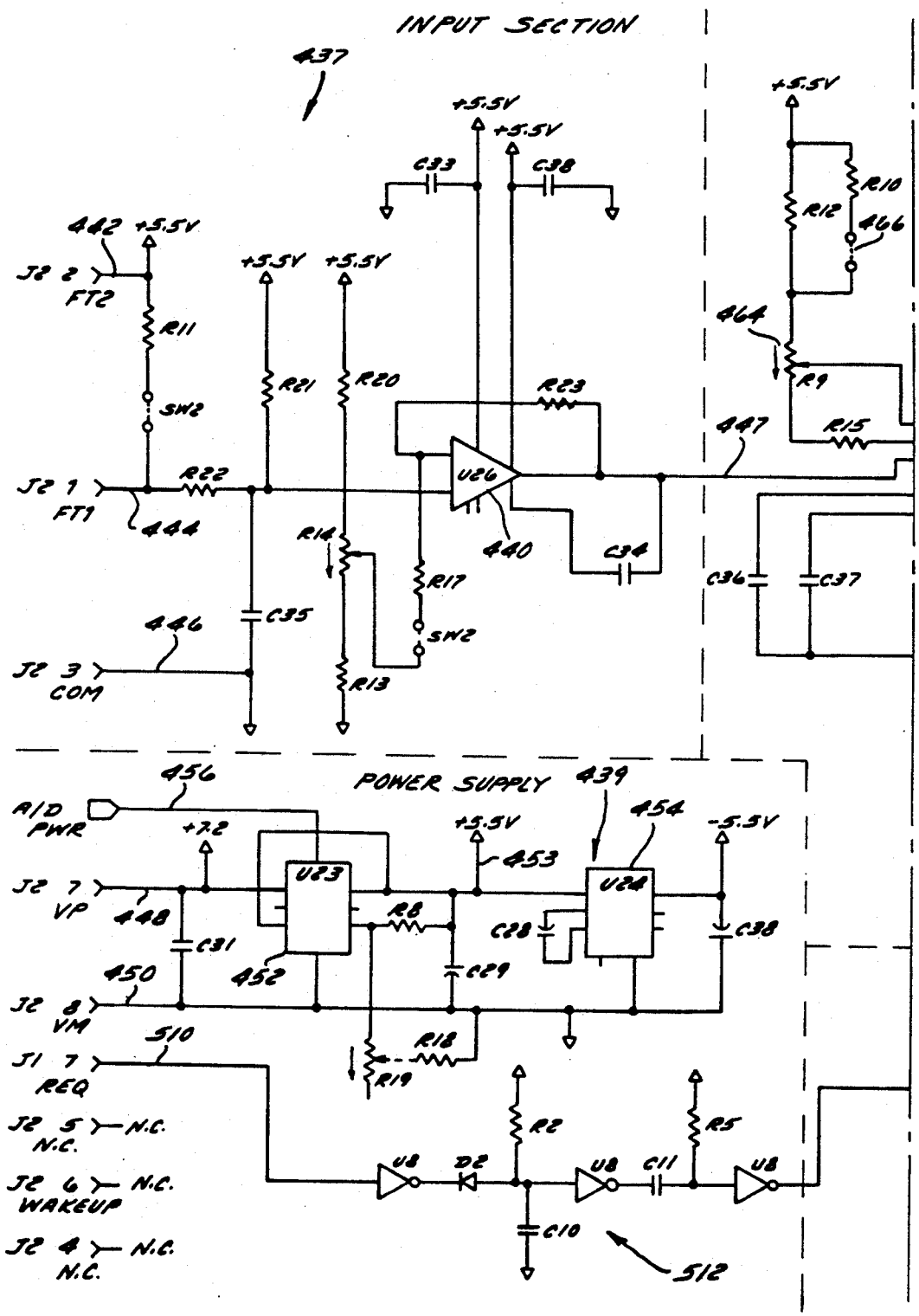
FIGS. 14A–14B, is an electrical schematic representation of an analog input board as one type of input/output device for utilization with the system of the present invention.
Figure 14B:
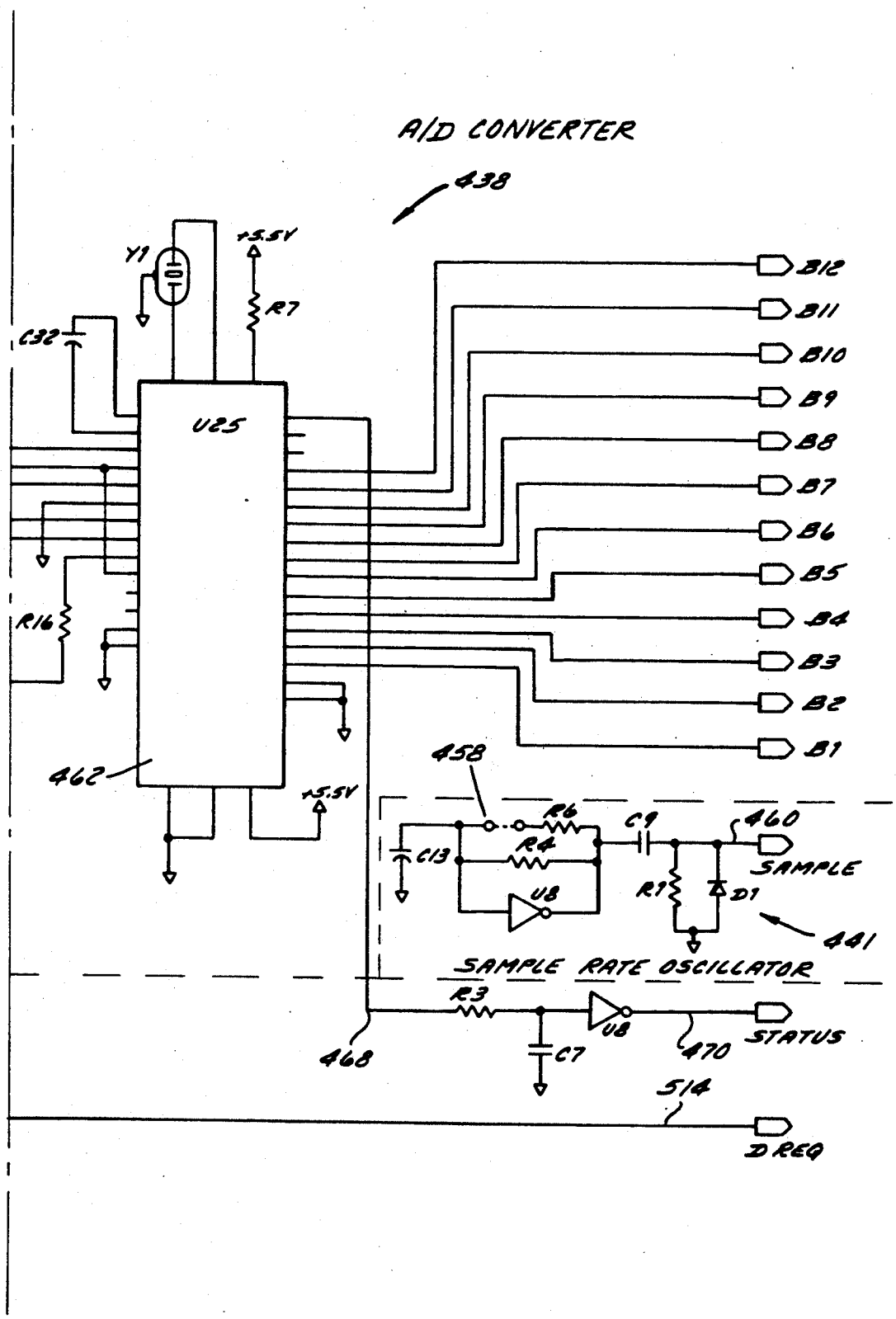

Referring to FIG. 14, therein is illustrated a preferred electrical schematic of an infrared analog input board for use in the system according to the present invention. Generally, the analog input board converts an analog input signal (voltage or temperature) into a twelve bit digital equivalent. The point may then transmit this digital equivalent analog value to the base station via infrared signals by sending two, spaced pulses. In the preferred embodiment, the time between the pulses proportionally represents the twelve bit word.

As shown in FIG. 14, the preferred infrared analog input board comprises an input section 437, an analog to digital convertor section 438, a sample rate oscillator circuit 441, and a power supply circuit 439. Within the input section 437, an operation amplifier 440 provides a representative output of input signals received on input lines 442 and 444. Op-amp 440 scales the input signal received on these lines for the analog to digital converter section 438. For temperature measurements, a temperature probe connected between lines 442 and 444 provides the input signal. When a voltage input is desired, a potentiometer may be connected between the lines 442 and 446 with its wiper connected to the line 444. A resistor R11 provides the desired bias current for the temperature probe, while in the voltage input mode, R11 is not required. A potentiometer R14 connected to the feedback circuitry of the op-amp 440 provides a zero adjustment for temperature and voltage inputs within the input section 437. Thus, a temperature signal received between lines 444 and 446 or a voltage signal received in conjunction with line 442 each results in a scaled signal on a line 447 to the A/D converter 438.

In FIG. 14, the power supply section 439 receives a positive 7.2 volt supply on lines 448 and 450. A voltage regulator 452 regulates the 7.2 input voltage and provides a regulated positive 5.5 voltage on an output line 453. An integrated circuit 454 is used as a voltage inverter and inverts this positive 5.5 voltage into a regulated, negative 5.5 voltage on a line 455. The present 5.5 voltage signals on lines 453 and 455 are then used to power the input circuitry and the A/D converter. The power delivered via these lines 453 and 455 may be cycled on and off by means of a signal received on a line 456 from digital circuitry associated with the analog input board and described below in conjunction with FIG. 15 to conserve power.

Referring now to sample rate oscillator section 441, in the preferred embodiment the sample oscillator may provide an oscillation frequency of either 1 Hz. or 0.2 Hz. by means of a switch 458. This controls a sample rate provided on a line 460 to the digital circuitry discussed below.

The analog to digital converter section 438 generally comprises a twelve bit A/D converter 462 which converts the analog input received on the line 447 into a twelve bit value on output lines B1 through B12. A variable resister 464 controls the full scale value of the A/D conversion. A switch 466 provides the switchover for use of the full scale adjustment of variable resistor 464 for either voltage or temperature inputs. A high signal on a line 468 indicates that a new, stable, twelve bit value is present on lines B1 through B12. A resistor R3 and a capacitor C7 introduce a delay between the appearance of a signal at line 468 and the appearance of a resulting signal at a line 470. This signal may then be inverted as an output status signal on a line 470 for further processing.

Figure 15A:
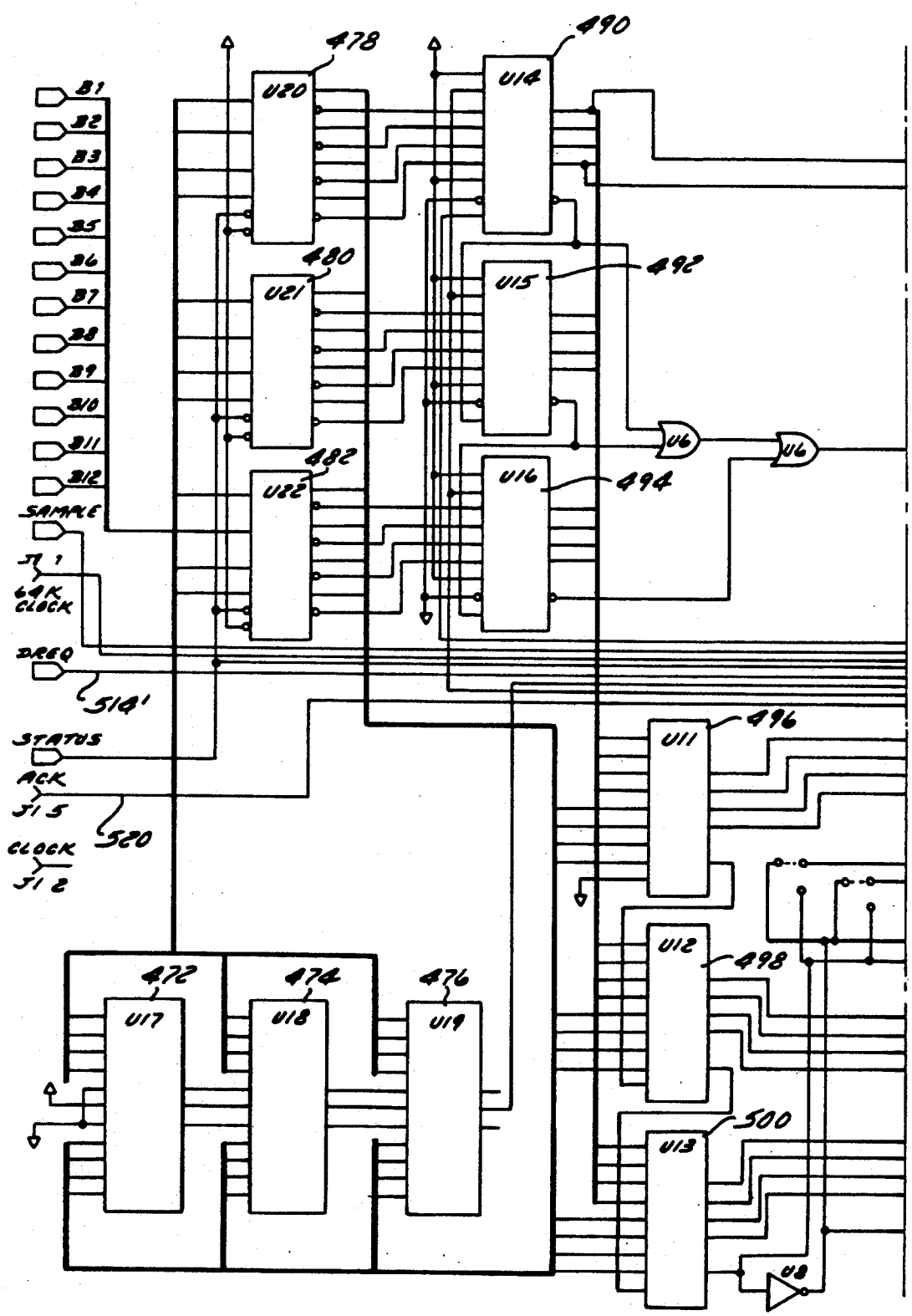
FIGS. 15A–15B, is second electrical schematic diagram of an analog input board for use in conjunction with the system of the present invention.
Figure 15B:
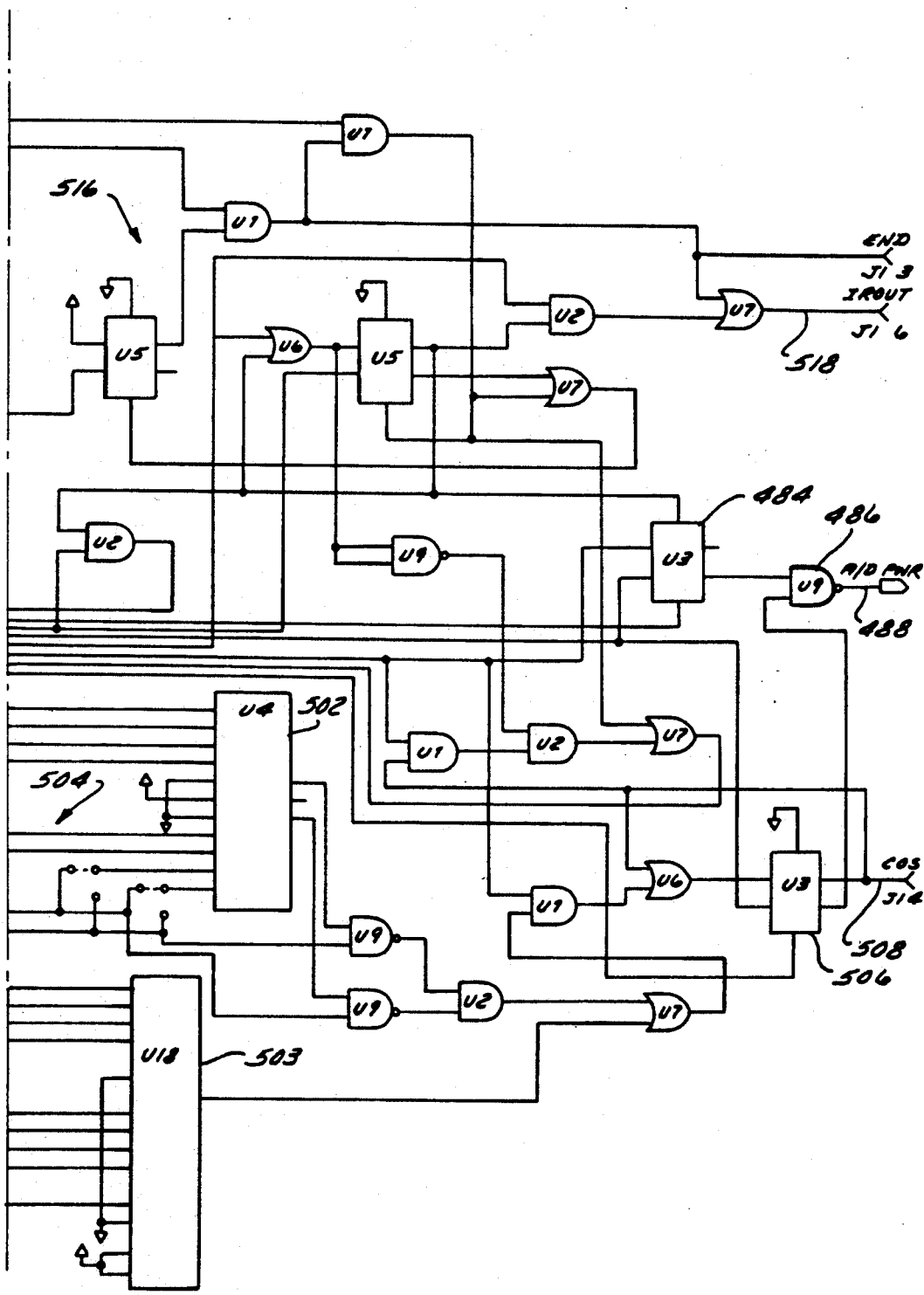

As indicated from the discussion above, various sections of the analog input board illustrated in FIG. 14 operate in conjunction with digital circuitry which is further illustrated in FIG. 15. Referring now to FIG. 15, registers 478, 480 and 482 hold the current state of the digital output from A/D converter 462 received on lines B1 through B12. The next occurring stable value from the A/D converter 462 may be compared then by compactors 472, 474 and 476 with the present value in the registers 478, 480 and 482. If the values are different, the A/D converter 462 has not stabilized. Registers 478, 480 and 482 receive and latch the new value in preparation for the next conversion. If however, the values are the same, the A-D converter power shuts down via latch 484. This occurs as the not-Q output of latch 484 falls low to drive the output of a NAND gate 486 low on a line 488 which communicates with the input line 456 of the power supply 439, thereby shutting off the voltage output signals from lines 453 and 455.

Once a new value has been received, it must be compared with the last value to see if the change of state latch should be set to initiate the sequence of events resulting in the transmission of the analog input information to the base station. The last value which was previously transmitted to the base remains stored in the registers 490, 492 and 494. This value and the new value are added through the action of adders 496, 498 and 500 to create a digital difference signal. This resulting difference may then be compared with the selected setting of a sensitivity switch 504 via comparators 502 and 503. If the difference between the values is greater than the selected switch setting, the change of state latch 506 will be set and the data transmission initiated. The sensitivity switch 504 may be set at whatever value of incremental change may be desired to be reported to or monitored by the base station or may be otherwise of interest.

Once the analog input board receives a request for data, a signal on a line 510 (on FIG. 14) will be pulsed low and then delayed by means of the delay circuitry 512 to provide an output signal on a line 514 to the digital circuitry. Line 514 from FIG. 14 is illustrated in FIG. 15 as input line 514' which initiates a transfer of the digital information from the counters/registers 490, 492, 494 by means of circuitry 516 to result in output signals on a line 518. More particularly, once a signal from line 514' is received, it is delayed and passed as a reference pulse out on the line 518. At the same time, the counters of registers 490, 492 and 494 begin to countdown. When a zero count is decoded by the circuitry 516, a second pulse is transmitted. As mentioned previously the time between these pulses is proportionally representative of the value of the analog input.

At this time, the change of state latch 506, which has previously impressed a high signal on the output line 508, will remain set. The analog to digital converter power will be shut off subsequent to the data transmission to the base station. However, once an acknowledge pulse is received on a line 520, the change of state latch 506 will be cleared and A/D conversion will again take place in a pulsed, power saving fashion and once a new value having an incremental difference greater than the selected sensitivity setting has been detected, the data transmission to the base station will be reinitiated.

Figure 16A:
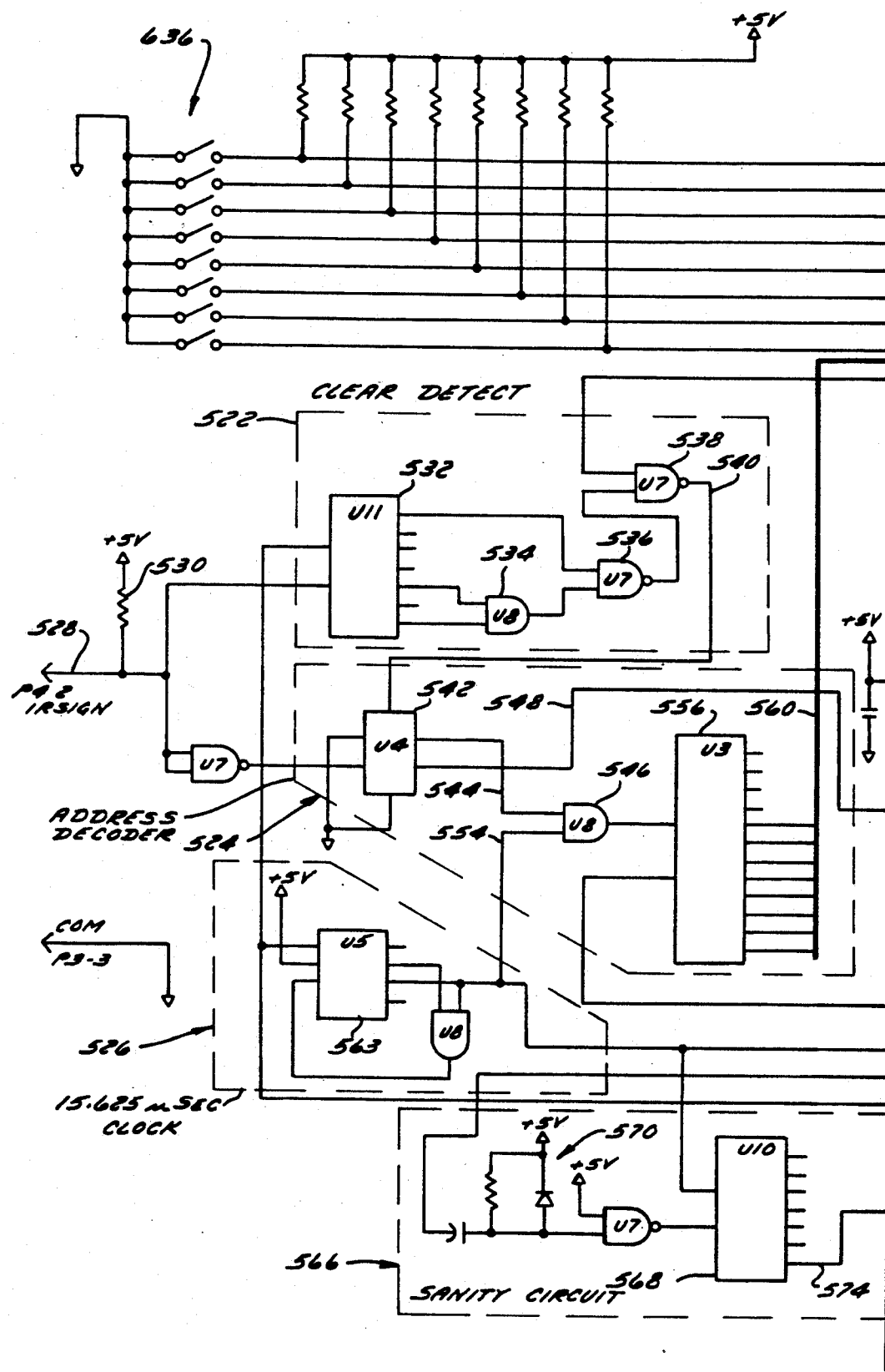
FIGS. 16A–16B, is a schematic diagram of a binary output board as a further example of a possible input/output device for use in conjunction with the system of the present system.
Figure 16B:
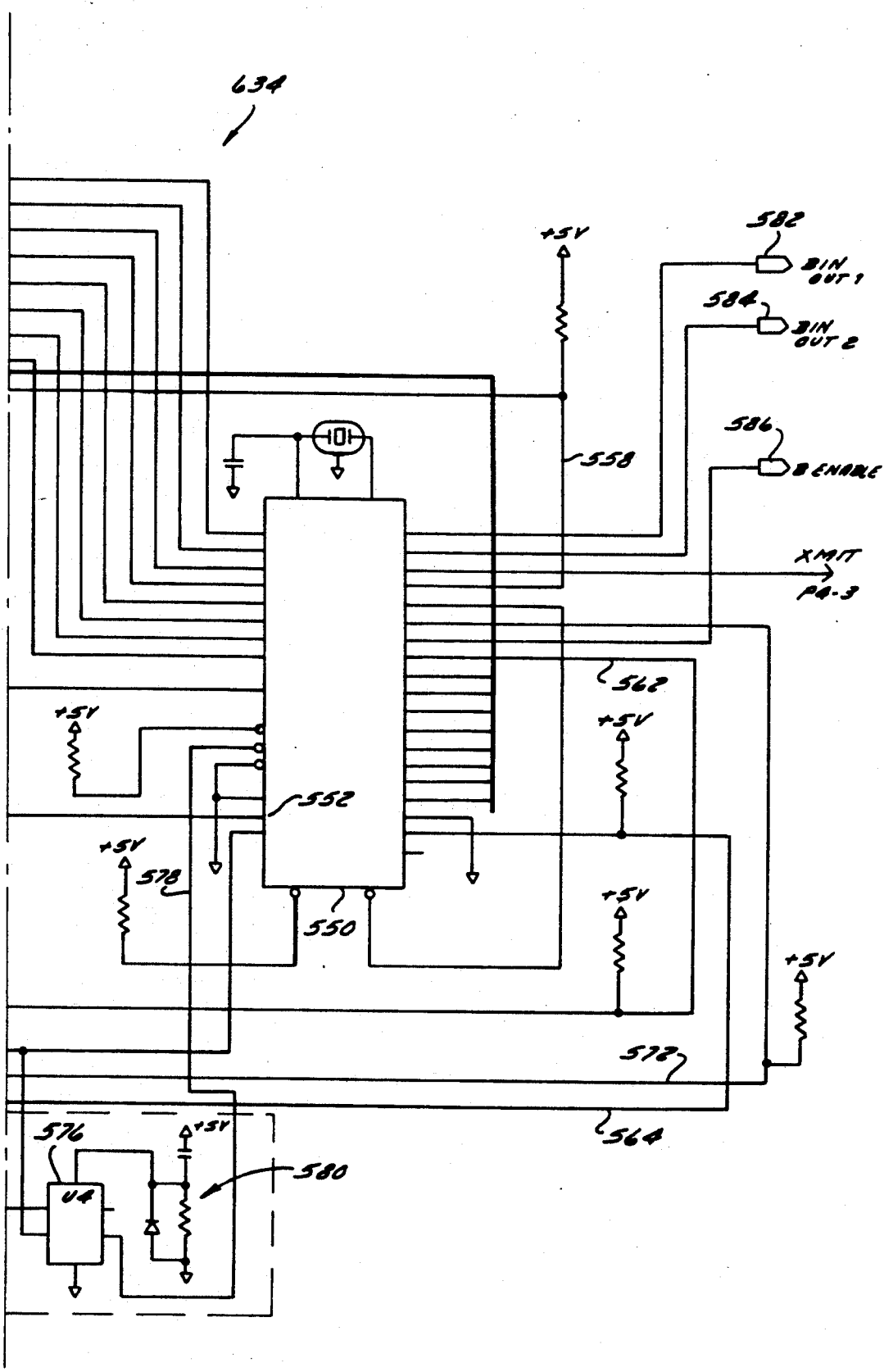

Referring now to FIG. 16, therein is shown a preferred electrical schematic of one of the two boards associated with the binary output boards for use in the preferred embodiment of the present invention. As shown in FIG. 16, the initial stages of the circuitry comprise a clear detect circuit 522 which detects the initiation of all data transfers by recognizing when a clear pulse has been transmitted by the base station. The circuitry of FIG. 16 further comprises an address decoder section 524 which decodes those signals occurring in the address window corresponding to the particular point board and as such provides for communication between the base station and the selected point board. The address decoder section 524 decodes by counting from the end of a clear pulse until the initiation of the next IR pulse. A microprocessor 550 detects the count and determines the appropriate response. Finally, a clocking section 526 provides the necessary timing for recognition of the clear signal to initiate data transfer sequences and for interval timing for address decoder 524 to recognize those signals directed to the particular point board.

Generally, a binary output board as shown in FIG. 16 comprises one of two boards for use as a binary output field point. The binary output board of FIG. 16 communicates with the infrared transceiver board and also to a binary output circuit at the field point The binary output board stands apart from the other field point boards through the use of its own power supply and by the fact that it decodes the infrared communication protocol without the aid of the protocol decoder. Three types of binary output boards known as maintain, momentary or actuator types may be used in the preferred embodiment and addressed in the range of address window "twenty-five" through address window "forty" of the preferred field interface controller.

The infrared transceiver board detects infrared communications which are then monitored by the binary output board. The system base station initiates contact with the binary output board by sending a regular command or a hold command. The hold command merely tests to see if a point is still operating correctly. If the base station sends a hold command, the field point must respond with an "acknowledge" signal. If the field point fails to correctly acknowledge, the master or base station assumes that the point is off-line. The master sends this type of hold command about every thirty seconds in the preferred embodiment to ensure that the binary output board remains operational.

Regular commands occur when the master needs to control the binary output. The binary output board decodes the command sent by the base station and sends an acknowledge pulse in response After receiving the command signal, the point board sends its address pulse during the next query sequence. This signals to the master that the point needs to be serviced Then, in response to the service or address pulse from the base station, the point sends a "working" pulse to confirm that a command has been received. At this point the master must acknowledge the working message. If the base station fails to acknowledge the working message, the binary output board ignores the previous command as noise and resumes normal operation. If the command was legitimate (as indicated by the acknowledge signal from the base), the point board carries out the appropriate command. When the command is completed, the binary output board once again enters the query sequence to be serviced. When subsequently serviced by the base station, the field point sends a "done" message to inform the base that the command has been executed. Again, the base station must acknowledge this communication; otherwise, the point board will continue to send the "done" message until such acknowledgment is received.

In the preferred embodiment, the binary output board is capable of supplying positive twelve volts and negative twelve volts at three hundred milliamps to the binary contact for any selected period of time. The preferred board includes microprocessor driving circuitry and its own power supply.

The remote board transceiver supplies infrared information to the binary output board of FIG. 16 on a line 528. A resistor 530, coupled to a positive voltage source, pulls the incoming infrared signal up to an appropriate signal processing level and supplies it to the clear detect circuitry 522 and the address decoder circuitry 524. The clear detect circuitry 522 comprises a counter 532 which receives the infrared signal as a reset input. Accordingly, the counter 532 operates for the duration of the infrared input signal in conjunction with AND gates 534, 536 and 538 which decode the outputs of the counter 532. Whenever the AND gates 534, 536 and 538 at the output of the counter 532 decode a count sufficient to indicate that the received pulse has a duration sufficient to be a clear pulse, the high output signal is supplied on a line 540 to the address decoder circuitry at a flip-flop 542. In the preferred embodiment of the present invention, the minimum duration for detection of a clear signal is 210.83 microseconds.

The logical signal on the line 540 to the flip-flop 542 sets the flip-flop 542 which then sends a high Q output signal on a line 544 to an AND gate 546 and a corresponding low not-Q signal on a line 548 for further processing. This line 548 communicates with a microprocessor 550 at a specified input port 552, which may be accessed directly from the microprocessor to test whether a clear pulse has been received. The high signal on the line 544 to the AND gate 546 enables that AND gate 546 to pass clock pulses received on a line 554 from the circuit clock 526 to a counter 556. The counter 556 then provides the count for decoding the address of the point.

Additionally, the microprocessor determines the elapsed time of the signal received on the input line 528. This is possible by means of a low signal supplied on a line 558 at another output port from the microprocessor 550. This signal, supplied as a second input to the AND gate 538, drives the line 540 high which sets a flip-flop 542 and ultimately enables the clock to the counter 556 as described above.

After activation of the address decoder counter 556 by the clear detect circuit 522 or the microprocessor 550, the counter 556 counts elapsed time until the next rising edge of an input signal on an input line 528. A next pulse on the input line 528 will clear the flip-flop 542 and drive the signal on the line 544 to the AND gate 546 low, which disables the clock input to the counter 556. The counter will then have at its output on a bus 560 a count representing the elapsed time from the clear signal to the next infrared data pulse. This count will represent the address of the remote field point with which the base controller was attempting to communicate. At the same time that the output signal on the line 544 from the flip-flop 542 goes low, the not-Q output of the flip-flop 542 on the line 548 will go high. As received at the port 552 of the microprocessor 550, this indicates that a new pulse has been received and the microprocessor should evaluate the displayed address count. The bus 560 communicates with the microprocessor 550 and allows the microprocessor 550 to read the address. After reading the address, the microprocessor 550 emits a high pulse on a line 562 which is tied to the reset input of the counter 556 and thereby resets the counter.

As shown in FIG. 16, the system clock 526 comprises a counter 563 which is enabled by the same output of the microprocessor 550 from a line 564. The counter 563 divides this signal in the preferred embodiment by six to provide a clock output signal on a line 554, which communicates with the address decode circuitry 524, a sanity circuit 566 and the microprocessor 550. In the preferred embodiment, the sync output on the line 564 has a period of 2.6 microseconds. The counter 563 of the clock circuit 526 divides this into a signal having a period of 15.625 microseconds. This time period represents one fourth the length of a standard infrared pulse in a preferred embodiment. As explained previously, the clock inputs to the circuit play a significant role in its operation, because the address decoding and command sensing functions depend upon the accuracy of the clock signal duration.

The sanity circuit 566 provides a processor circuit monitoring system which guarantees "sanity" in the overall system operation. In the sanity circuit 566, a counter 568 responds to the clock signals on the line 554 from the output of the counter 563 in the clock circuit 526. A counter 568 then counts up until a reset pulse is received from circuitry 570 from a line 572 which is connected to the appropriate output port on the microprocessor 550. When the microprocessor 550 is operating correctly, the strobe signal is sent on the line 572 to reset the counter 568 at least once per each two millisecond interval. The counter 568 thus ensures that the maximum period of time between the resets it receives from the microprocessor is 2 milliseconds. When counter 568 reaches a count corresponding to a two millisecond period, it sends a high pulse on a line 574 to a flip-flop 576 which sends a reset signal on a line 578 to the microprocessor 550 to reset the microprocessor. A hold down circuit 580 ensures that the reset signal on the line 578 is held down for a sufficient period to allow the microprocessor 550 to complete its reset operation. However, as mentioned above, the microprocessor program is designed to provide a strobe signal on the line 572 to reset the sanity circuit at least once per every two milliseconds to avoid being reset by its own sanity circuit.

Figure 17:
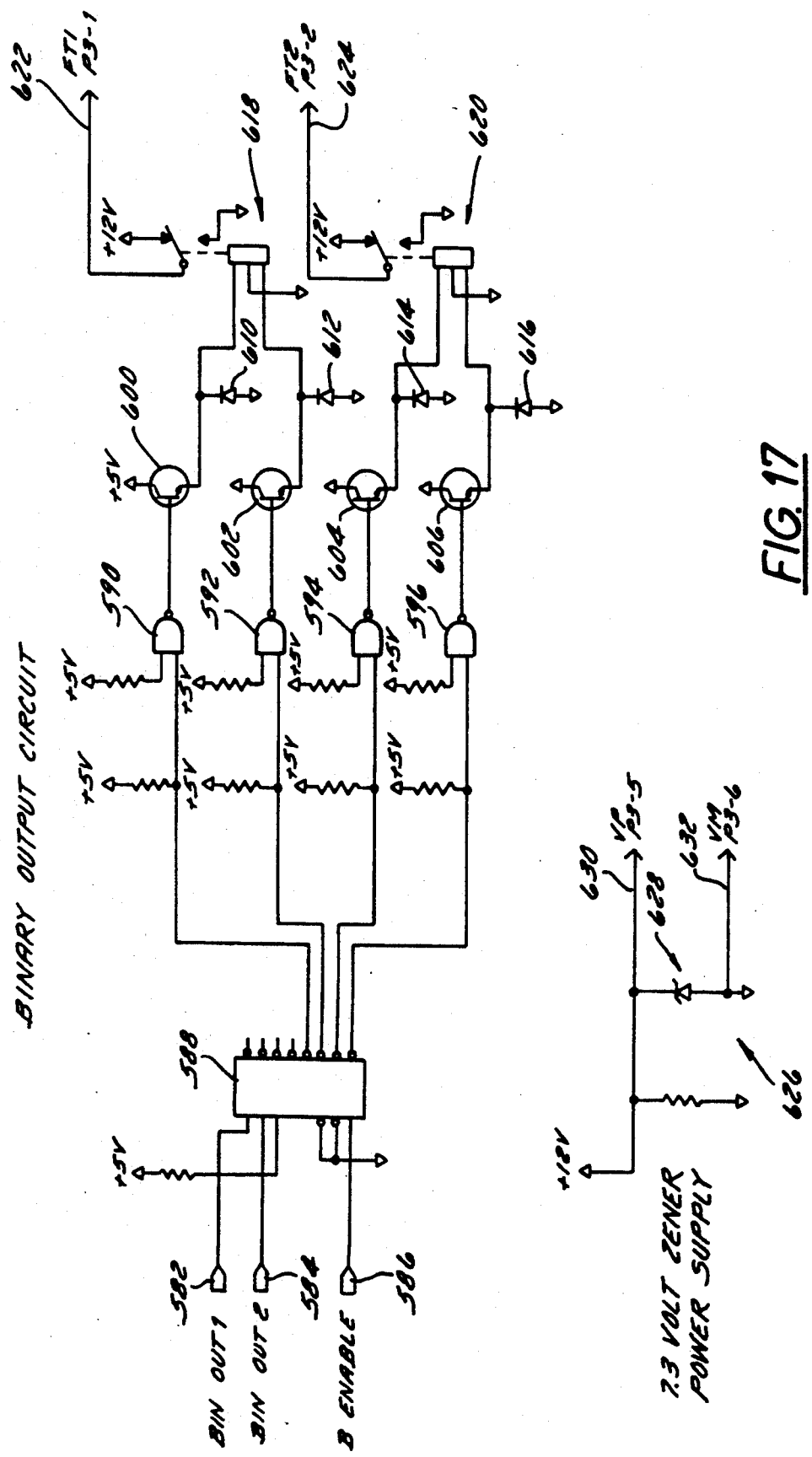
FIG. 17 is a further schematic diagram representative of binary output circuitry similar to that of FIG. 16.

Referring now to FIG. 17, therein is shown a binary output circuit for interfacing the binary output board of FIG. 16 with specific binary output devices. After receiving a command subsequent to the appropriate detection and decoding, the microprocessor 550 sends a two-bit output code on lines 582 and 584. A separate enable signal is also sent on a line 586. These three inputs are received by a decoder 588 which converts the two-bit signal on the lines 582 and 584 into the four output voltage levels required to drive the relay circuitry of the binary output circuit. As shown in FIG. 17, the binary output circuit comprises the decoder 588 in connection with four NAND gates 590, 592, 594 and 596, whose outputs are connected to four transistors 600, 602, 604 and 606, respectively, which are in turn connected to four diodes 610, 612, 614 and 616, respectively, which in turn drive two micro-relays 618 and 620. The NAND gates, transistors and diodes provide current required to drive the relays. As mentioned previously, these two relays are capable of providing positive twelve or negative- twelve volts and three hundred milliamps for any period of time desired. An appropriate binary-type output device may be connected between the lines 622 and 624.

FIG. 17 also illustrates a regulated zener power supply 626. The power supply 626 taps a twelve volt supply which in conjunction with zener diode 628 provides a regulated 7.3 volt power supply on lines 630 and 632 to the point and infrared transceiver.

Finally, the upper left portion of FIG. 16 illustrates a power-up information bus 634 which provides input to the data bus of the microprocessor 550. An eight bit DIP switch 636 provides the necessary input data to identify the address, type and time base for the microprocessor-controlled binary output board. This information may be supplied upon power up and in connection with each sanity reset.

Figure 18:
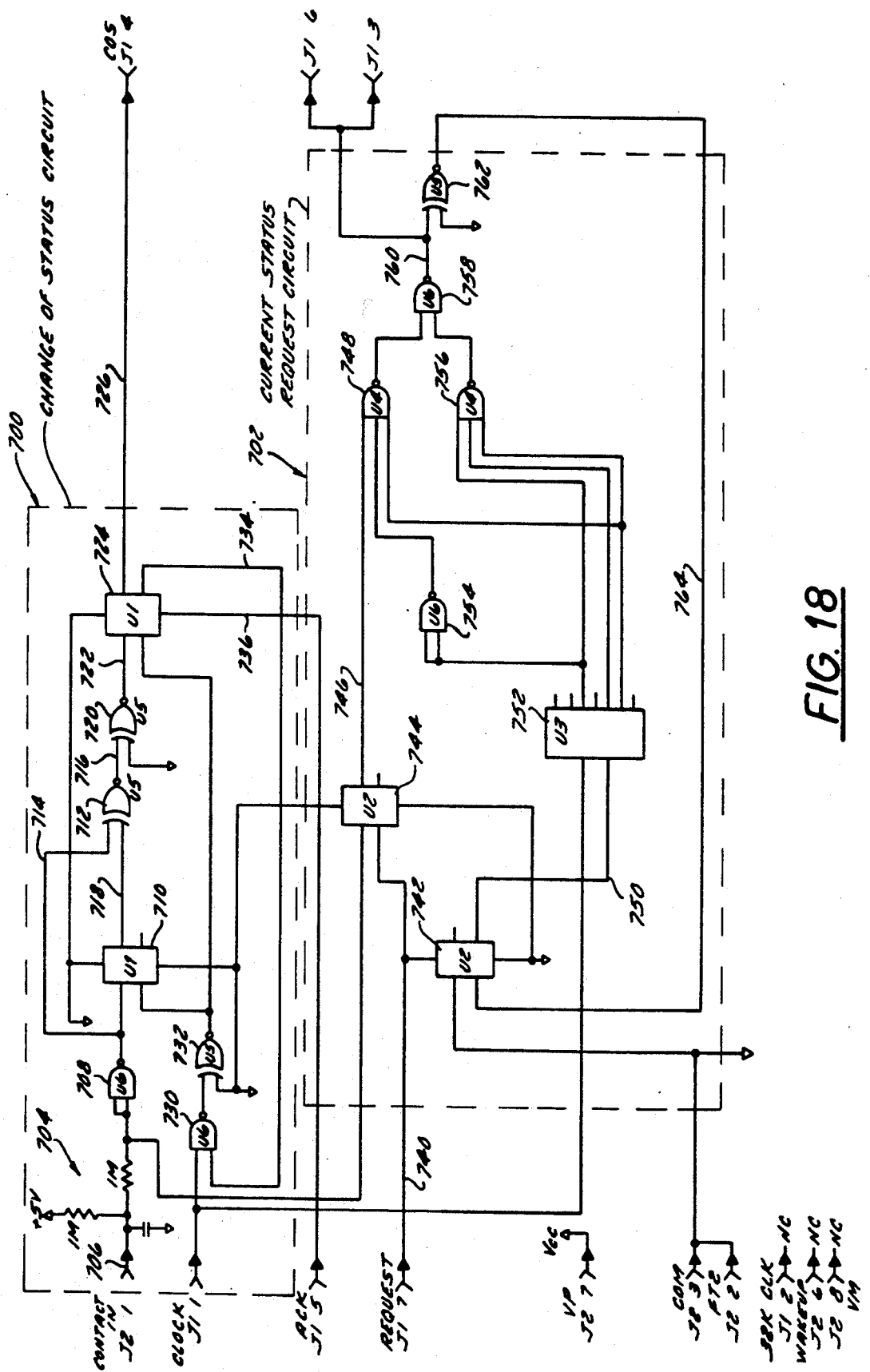
FIG. 18 is an electrical logic schematic illustrative of a type of binary input device which may be utilized in conjunction with the system of the present invention.

Referring now to FIG. 18, therein is shown a binary input board such as that outlined generally as binary input board 56 in FIG. 2. The binary input board of FIG. 18 generally comprises a first, change of state circuitry, section 700 in conjunction with a second, current status request circuitry, section 702. As mentioned previously, the binary input board interfaces between the infrared communication equipment and the field binary input. In conjunction with the infrared transceiver board and the protocol decoder board, the binary input board makes up a remote infrared field point as illustrated in FIG. 2.

Generally, the IR transceiver board transmits and receives the infrared signal, and the protocol decoder board interprets the infrared communications and also controls the binary input board. The binary input board communicates through hardwire contact to a field point for monitoring purposes.

Whenever the field contact changes state, the binary input board generates a latched change of state signal which is then processed and sent to the system base controller via the protocol and transceiver boards as discussed previously. This would typically occur by the field point entering the next-occurring query sequence. When the base controller identifies a query flag from the remote point, it generates a current state request and sends it to that particular field point. The protocol board then decodes this message and sends a request pulse to the binary input board. The request pulse initializes the time frame on the binary input board for its responsive pulse. Under the preferred protocol, a responsive pulse by the binary input board occurring 537.5 microseconds after the request pulse indicates that the binary contact is open. A responsive pulse occurring 750 microseconds after the initial request pulse indicates that the contact is closed. The appropriate one of these pulses is transmitted from the binary input board through the IR transceiver to the base station.

The communication process subsequently terminates when the base station sends an "acknowledge" signal to the binary input board. The protocol decoder board decodes this signal and sends it to the binary input board. The acknowledge signal as received at the binary input board clears the latch change of state circuitry until another contact status change occurs.

More particularly, the binary input board performs two major functions: (a) recognition of the change of state of binary contact; and (b) communication of the contact status to the base station using the time position protocol. As mentioned previously, the circuit hardware comprises a change of state circuit 700 and a current status request circuit 702.

Referring now to the change of state circuit 700, a low pass debouncing circuit 704 receives the binary input data on a line 706. This passes through a Schmidt trigger inverter 708 into a triggering flip-flop 710. The Q output of the flip-flop 710 is passed through an XOR gate 712. The other input to the XOR gate 712 is the output of the inverter 708 supplied via a line 714. The output of the XOR gate 712 on a line 716 represents a change of state signal.

This may occur only when the inputs to the XOR gate 712 are logically unequal. When the change of state occurs, the line 714 supplies the new level immediately to the XOR gate 712. However, the Q output of the flip-flop 710 on a line 718 does not supply the new logic level until the next rising clock pulse is received on a line 720 at the flip-flop 710 plus the propagation delay inherent in the flip-flop 710. Accordingly, upon occurrence of a change of state at the input line 706, a momentary logical inequality exists at the inputs to the XOR gate 712. This results in a high logic signal on the line 716 indicating a change of state. This passes through a further XOR gate 720 whose other input is tied low so that only a logic high input on the line 716 supplies a high output signal on the line 722. The signal on the line 722 is then supplied to a change of state latch flip-flop 724 and creates a logic high output on a line 726 indicative of a change of state condition.

Flip-flops 710 and 724 are clocked by a 64 kHz. clock signal received on a line 728 from the protocol decoder board. A NAND gate 730 receives the 64 kHz. input clock as one input and the not-Q output of change of state latch 724 as its other input. The clock signal then passes through an XOR gate 732 and on to the flip-flops 710 and 724. However, when a change of state occurs, the signal at the Q output of the flip-flop 724 on the line 726 goes high. Correspondingly, the not-Q output on a line 734 goes low. This disables the clock pulse at NAND gate 730 and thereby latches the flip-flops 710 and 724. The flip-flops remain latched until an acknowledge signal is received on a line 736 at the reset input of the flip-flop 724. This releases the inhibiting signal from the line 734 and allows the clock signal to pass again to the flip-flops so they may change state as necessary.

Returning now to the current status request circuit 702, this circuitry receives a request signal as decoded by the protocol decoder on a line 740 which is then supplied to a first flip-flop 742 and a second flip-flop 744. The second flip-flop 744 receives as its data input the binary input information received on the input line 706. Upon receipt of the request pulse at its clock input, the flip-flop 744 latches the current binary status in and presents it on its Q output line 746. Any change of state which occurs then during the status reporting operation will be latched into the change of state circuitry 700 but will not affect the reporting circuitry 702. The binary signal on the line 746 is then provided as one input to NAND gate 748. The first flip-flop 742, which receives the request pulse at its S input, responsively sends a reset signal on a line 750 to a counter 752. The counter 752 then begins to count 64 kHz. clock pulses received from the input line 728. The output of the counter 752 is then decoded through NAND gates 754, 756, 748 and 758 to provide the appropriate responsive pulse at the appropriate time after receipt of the request pulse.

As mentioned previously, if the contact is open, a logical high signal will be present on the line 746. A count of thirty-two at the output of the counter 752 will result in a responsive pulse being generated on the output line 760. The count of thirty-two corresponds to the previously identified, preferred 437.5 microsecond time interval. If the contact is closed, however, a count of fifty-two at the output of counter 752 is required to generate a high output signal on the line 760 and thereby the desired responsive pulse. Again, a count of fifty two corresponds to the seven-hundred-fifty (750) microsecond preferred time interval for indicating a closed binary contact.

The responsive pulse on the line 760 is also provided through an XOR gate 762 and via a line 764 back to first flip-flop 742 which clears the flip-flop 742 and resets the counter 752 until a further request pulse is received.

Although discussed above in conjunction with various elements of circuitry utilized in the system of the present invention, the infrared communication protocol now may be summarized. The information transfer or communication between the base transceiver and any remote field point may be initiated only subsequent to the transmission by the base transceiver of a unique initiating pulse, known as a clear pulse, having a predetermined unique duration. In the preferred embodiment, this corresponds to a 250 microsecond pulse. The remaining pulses in the information protocol then may be identified with reference to the time of occurrence subsequent to the clear pulse. Although not necessary, all subsequent pulses in the information transfer communication have a second unique duration which in the preferred embodiment corresponds to a period of 62.5 microseconds, which may be readily differentiated from the longer enduring clear pulse.

Once a clear pulse has been transmitted and received, one of a number of different communication modes may be entered. If the base transceiver sends a second infrared pulse of the second duration during a first unique time address slot, then each of the associated field points must send back a responsive pulse in its own unique time address slot to indicate that it has (and only if it has) information such as change of state data to report to the base station. This second pulse is known as a "query" pulse, typically of a duration of 62.5 microseconds, and occurs in address window "one" following transmission of the clear pulse. (Note: As explained above, each address window typically comprises a period of 250 microseconds.) The responsive pulse sent by the remote field point in its own address slot typically has a duration of 62.5 microseconds and is intended to serve as a flag to tell the base station that further communication is necessary with this particular field point. When the base station receives a flag response from a particular field point, it notes the address of the field point and subsequently interrogates it directly to learn of the information or change of state data present there.

If the base station does not send the query pulse in address window one, it may selectively address one of the associated field points by transmitting an address pulse in the address window corresponding to the selected field point. That field point is then alerted to respond to the inquiry from the base station. If the proceeding query sequence has been responded to by that field point, the address pulse is passed as a request pulse to initiate data transfer. If no query sequence has been previously exchanged with that field point, the field point views the pulse in its address window as a "poll" request and must subsequently transmit a responsive pulse to indicate that it is still "on line." Again, each of these pulses typically has a duration of 62.5 microseconds.

If the base station desires that all of the field points report their status regardless of whether change of state or other triggering data has occurred at the various points, it may send a third distinct pulse. Again, this pulse has an exemplary duration of 62.5 microseconds. However, it occurs in a time slot in the preferred embodiment which is subsequent to the last of the field point address windows. This pulse is decoded by each of the field points regardless of their individual addresses. Each field point must then respond to the next occurring query pulse by transmitting its address pulse in its address window. Each field point will then be individually addressed by the base station and will supply its current status or data to the base station.

To keep track of each of the field points and their current status, the base station periodically polls the field points. If a field point fails to enter a query sequence within a sixty second interval or represents a particularly critical point and has not responded within a five second (or other selected) interval, the base station preferably will poll that point. Polling occurs when the base transmits the address of the point in question even though the point has not sent a flag pulse during the proceeding query sequence. When a point receives its address pulse and has not responded to a query pulse (i.e., the change of state latch is not set, no wake-up signal is present and no forced change of state signal has been received), the point recognizes the received pulse as a poll request. To satisfy the polling base station, the point must send a single responsive pulse at the end of a defined time interval. In the preferred embodiment, this time interval corresponds to 125 microseconds. Again, the typical duration of both a poll request pulse and a poll responsive pulse is 62.5 microseconds.

As explained above, at a field point utilizing an analog or binary input board, the protocol decoder interacts with the field point board to decode and encode information for transmission by the IR transceiver to the base station. The decoder receives infrared pulses from the transceiver and also supplies infrared pulses to the transceiver. The protocol decoder board also supplies and receives various control signals and data from the point board itself.

When a change of state occurs at the point board, the point board sends a change of state, COS, signal to the decoder. This causes the decoder to send a responsive flag signal during the point board's address window in response to the next query pulse from the base station.

When the decoder enters the query sequence by sending the pulse in the point board's address window, it also sends a wake-up signal to the point board. This enables the point board to be ready for transmission of its data or status when the point is subsequently interrogated by the base station.

Again, subsequent to entering a query sequence, the base will address each responding point by sending an address pulse in the address window corresponding to that point. When the decoder receives the address pulse, it passes it on to the point board as a request pulse which causes the point board to begin transmitting data to the decoder. The decoder then relays that data to the point transceiver which transmits it through the infra-red communication channel to the base station. Once again, the request pulse has a typical duration in the preferred embodiment of 62.5 microseconds.

Coincident with the last data pulse sent to the decoder, the point board will also send an end pulse to the decoder. This end pulse indicates that no further data will be reported. Upon detection of the end pulse, the decoder reconfigures the query detect circuitry to look for an "acknowledge" pulse from the base station.

Once an acknowledge pulse is received from the base station, the decoder passes it through to the point board. This resets the point board and the decoder, which then sit idle until a change of state which must be reported occurs.

Also, the decoder may receive a force change of state signal or a poll request from the station. The force change of state signal causes the decoder to enter the next query sequence and sends a wake-up pulse to the point board as described above.

When a point enters a query sequence by sending a flag pulse during the address window, it will need to be serviced by the base. Upon detection of the point's address in the query sequence, the base will subsequently send an address pulse in that remote point's address window following the next clear pulse. This pulse is passed by the protocol decoder to the point board or is received directly by the binary output board to initiate the transmission of data regarding the status or information present at the point board. The actual data transmission may lag the request pulse by a small time period depending upon the type of board reporting. Once the point sends its end pulse at the conclusion of data transmission, the base responds with an acknowledge pulse in address window one. In the preferred embodiment, this occurs 187.5 microseconds after the end pulse.

On defined occasions, the base station may need to command the various field points to perform assorted functions or to report their status. If the field point is a binary input board, it must report the state (open or closed) of its point. To accomplish this, the base addresses the point by transmission of an address pulse in the appropriate address window following a clear pulse. The protocol decoder at the field point passes this pulse to the point board as a request pulse which initiates the transfer of data. If the point is open, it emits a pulse for transmission to the base at a time 437.5 microseconds after the end of the address pulse. However, if the point is closed, it emits a pulse for transmission to the base after a delay of 750 microseconds. The base must then acknowledge the data by sending back an acknowledge pulse 187.5 microseconds after the end of whichever pulse the remote point transmits. The acknowledge pulse is passed through the protocol decoder to the point board to reset it for the use. Again, the open and closed pulses have a typical duration in the preferred embodiment of 62.5 microseconds.

If the board to be communicated with is a binary output actuator board, then the command sequence requires it to do nothing, extend or retract in the preferred embodiment. Other binary output boards may perform all or merely selected ones of those three functions. The base unit initiates this command sequence by transmitting the point's address pulse in the appropriate address window following a clear pulse. The point decodes its address pulse and looks for the command pulse which is to follow. A pulse sent by the base which occurs 187.5 microseconds after the address pulse indicates that the remote point is to "hold" or "do nothing." The point responds to this pulse with an "acknowledge pulse" within the following 250 microseconds. The hold or do-nothing pulse will have a typical duration of approximately 62.5 microseconds. In the preferred embodiment, the hold or "do-nothing" interval is defined as the first 250 microseconds following the address pulse.

If no command pulse occurs within the 250 microsecond hold interval, the point continues to look for a command pulse. If one occurs in the next sixteen milliseconds, that pulse indicates an "extend" command. Once again, the point must respond by transmitting an acknowledge pulse within 250 microseconds following the extend pulse.

If no pulse occurs in the first sixteen milliseconds following the hold interval, the point continues to look for a command pulse. A pulse which occurs in the second sixteen milliseconds following the hold interval indicates a "retract" command. Again, the point must respond with an acknowledge pulse within the following 250 microseconds.

If a hold pulse is transmitted by the base, the receipt by the base of an acknowledge pulse from the point ends the communication sequence. If no acknowledge pulse is received, the base determines that the point has gone off line and appropriate action may be taken.

However, if the retract or extend command was sent by the base and an acknowledge pulse returned by the point, further communication is necessary. The point must then enter the next query sequence by sending its address in the appropriate address window. In response to the ensuing address pulse from the base, the point responds to indicate status of the command. If the point transmits a pulse at the end of 312.5 microseconds after the addressing pulse, the base determines that the command has been executed. The base then sends an acknowledge pulse to the point and the communication sequence ends.

However, if the point transmits a pulse at the end of 625 microseconds after the addressing pulse, the base determines that the point is still "working" on the command. The base then responds with an acknowledge pulse and awaits further status reports from the point. The point continues working on the command and once it has finished the command, it enters the next ensuing query sequence by responding in its address window. Upon detection of the point's address in its address window, the base addresses the point. The point then responds by sending a "done" pulse at the end of 312.5 microseconds after the address pulse. If the base responds with an acknowledge pulse within the following 250 microseconds, the command sequence terminates. If the base fails to respond, the point continues transmitting the "done" information until it is acknowledged by the base.

Although described above in terms of a number of preferred embodiments, the system of the present invention and its novel features are defined with particularity in the appended claims. The claims are intended to embody the spirit and thereby the scope of the present invention. Such modifications and alterations as would be apparent to one of ordinary skill in the art and familiar with the teachings of the present application are deemed to fall within the scope of that invention. Appropriate computer program listings are set forth following.

The following comprises the machine-readable computer program listing for the type 8742 processor in the FIC:

```
:02 0000 00 0409 F1    :02 0003 00 0421 D6
:10 0070 01 F9 32 31 09 0F 59 AEF2 7B8 7FB9 60 A0 F0 96 59
:10 0017 00 21 C8 E9 14 14 27 14 DA0 4FE8 A0 19 AFE0 42 18 0
:10 0027 00 BF0 0FFD3 0 FC6 39 D6 29 22 76 35 04 29 14 3 AE3
:10 0037 00 04 29 83 03 3 DB3 44 46 48 4 A4 C4 E5 00 46 00 4 A8
:10 0047 00 52 04 52 22 46 B0 4 52 22 47 A2 49 FD6 52 22 76 5 C9 F
:10 0057 00 FF4 30 EAF8 32 31 00 48 1 BE0 9 B8 23 14 73 B8 7 E
:10 0067 00 23 14 87 14 98 14 ADFF4 30 1 AF8 3 D6 73 22 76 08
:10 0077 00 DA0 18 EE7 38 32 31 00 48 14 34 09 00 20 48 50 A
:10 0087 00 B9 58 F0 BB0 86 7 E6 93 21 43 90 21 19 EB8 C1 80 8
:10 0097 00 83 B9 60 BC0 2 F0 BB0 86 7 E6 A6 21 43 90 21 19 2 B
:10 00A7 00 EB9 F1 8 EC9 C8 3 BD0 3 BE0 1 B9 70 BA3 8 BC0 2 44
:10 00B7 00 BB0 8 F0 67 A0 E6 C8 F1 43 90 A1 14 D6 FEA1 14 CF
:10 00C7 00 D6 19 1 A1 AEBB9 18 ECB7 FEE7 AEEDB1 83 F9 FA
:10 00D7 00 2 AA9 83 D5 14 EC2 30 ABBA0 AA0 00 0 EAE4 EB0 3
:10 00E7 00 E1 14 F5 C5 83 BA2 F9 9 EFEAF0 89 10 83 99 EFE8
:10 00F7 00 BA0 AEAF9 89 10 83 34 04 34 36 04 FED5 B8 58 AD
:10 0107 00 BC2 8 BD0 8 14 ECBA2 0 EA0 F1 4 F5 BA0 5 EA1 5 A5
:10 0117 00 BE0 ABA1 5 EA1 B3 62 B0 00 0 EE1 D1 8 BA0 6 EC0 C
:10 0127 00 1 BC5 83 00 F0 4 DA0 EE2 A1 8 BA0 6 EC1 B9 33 4 CA
:10 0137 00 3 D3 4 BCB6 36 83 23 E0 90 8 A1 00 28 64 39 AEF9 B
:10 0147 00 D6 47 27 9 02 2 C6 68 AEB8 23 03 24 A0 18 FE0 31 B
:10 0157 00 EBF6 69 14 73 B8 24 F0 18 14 3 AB9 23 F1 D8 96 5 A
:10 0167 00 5 E8 30 48 1 34 8 FF1 43 40 A1 FAA9 19 FB4 75 3 F9
:10 0177 00 0 FA1 83 34 8 FF1 43 40 A1 FAA9 FB5 3 10 2 15 3 F8
:10 0187 00 EF4 1 A1 19 F0 18 A1 83 F0 18 AB5 30 FAC0 37 01 E
:10 0197 00 A9 FC9 7 F7 03 38 AA8 3 F0 5 30 FA9 F0 18 D2 B3 3 5
:10 01A7 00 B2 AEF9 03 5 82 4 B6 F9 03 60 24 B6 F9 03 70 A9 6 F
:10 01B7 00 F1 43 0 BA1 83 B8 20 F0 96 C3 B0 58 F0 03 A8 AD6 4
:10 01C7 00 53 F8 96 D1 BE1 05 40 02 4 FD0 3 E8 F6 DFFD0 37 3
:10 01D7 00 F8 ADBE2 0 54 D4 24 FDFD0 3 E8 ADBE4 0 B9 21 DF
:10 01E7 00 F1 A9 74 57 23 21 29 A1 F8 D3 80 C6 FD2 33 8 A1 8 B
:0D 01F7 00 27 B8 20 A0 85 83 F8 B8 20 A0 85 95 83 47
:10 0200 00 F0 37 F2 12 72 0 B5 41 91 84 41 89 21 25 47 41 8 E1
:10 0210 00 44 18 18 F8 D3 60 96 00 83 F0 53 E7 A0 54 C5 99 AA
:10 0220 00 F7 89 08 35 16 49 26 24 65 89 01 42 03 E8 E6 49 1 D
:10 0230 00 BA2 7 EA3 2 14 F5 C5 F0 53 DFA0 42 03 D0 E6 44 F2
:10 0240 00 27 54 63 83 23 01 54 63 83 C5 83 27 62 AF4 52 50 5
:10 0250 00 99 FA8 32 32 EAD0 0 ED5 7 EE5 58 3 F8 03 A8 17 C6
:10 0260 00 D5 AE8 3 A9 23 80 90 FD8 A1 00 28 66 B9 AEFF9 A0
:10 0270 00 02 86 71 83 54 C5 99 F7 89 08 35 16 90 26 7 B6 5 E7
:10 0280 00 89 01 C5 42 03 E8 F6 8 FF0 53 CFA0 27 54 B0 83 0 D
:10 0290 00 65 89 01 C5 54 97 83 F0 B2 A5 53 03 C6 A5 07 20 0 D
:10 02A0 00 83 FC4 0 A0 83 F0 53 EF4 32 0 A0 23 01 54 B0 83 BC
:10 02B0 00 C6 C1 23 A0 90 FD4 E8 A1 00 28 6 BA9 AEF2 79 0 FD
:10 02C0 00 83 23 C0 44 B4 54 5 C5 44 B1 4 ECBD1 EEDCD5 49 8
:10 02D0 00 53 14 F5 83 F0 37 F2 E4 72 DE7 40 01 88 39 2 E4 6 D
:0B 02E0 00 54 74 18 83 18 F8 03 70 96 D4 83 40
:10 0300 00 F0 53 E7 A0 54 C5 89 04 BA1 63 61 4 EA0 ABA1 89 D
:10 0310 00 36 1 AEA1 08 90 13 56 5 C5 83 99 FBBA2 FBB8 26 D
:10 0320 00 FAAA0 03 62 BEA2 3 EB2 16 41 43 56 58 90 1 BA5 9
:10 0330 00 29 EA3 1 14 F5 B8 23 FF9 76 7 A0 42 67 18 A0 F9 9 E
:10 0340 00 C5 A9 23 60 90 FD8 A1 00 28 64 99 AEFBA0 2 F1 8 E
:10 0350 00 02 86 51 C9 EA4 F8 3 F0 F2 63 18 19 19 F8 D3 80 65
:10 0360 00 96 57 83 72 76 92 6 BD2 6 B6 47 8 F1 52 72 94 4 B8 B
:10 0370 00 06 47 87 4 B2 64 78 74 7 C1 81 91 98 3 F0 53 F7 A0 08
:10 0380 00 54 C5 99 F7 89 08 35 16 B0 26 87 65 89 01 42 03 57
:10 0390 00 E8 E6 B0 BA2 7 EA9 5 14 F5 C5 F0 53 DFA0 42 03 AA
:10 03A0 00 D0 E6 A7 27 94 38 83 23 01 94 38 F1 53 F7 A1 83 2 B
:10 03B0 00 C5 83 27 90 F0 85 A5 D5 B8 23 C5 92 D7 19 F1 D5 67
:10 03C0 00 A0 C5 C9 F1 F2 C7 95 D5 B8 23 C5 54 C5 76 DABA2 8
:10 03D0 00 04 EAD1 F0 AD6 4 E8 B5 64 C7 BA0 6 EADC6 4 F0 BB
```

-continued
```
:1 0 0 3 E 0 0 0 BA0 8 EAE2 8 5 0 0 BDFEBA0 AEAEAEDE8 B6 E0 3 C
:0 5 0 3 F 0 0 0 1 4 F 5 9 4 0 0 8 3 E8
:1 0 0 4 0 0 0 0 2 3 CF6 5 6 2 4 5 9 9 F7 8 9 0 8 3 5 1 6 2 7 2 6 0 A8 9 0 1 A1
:1 0 0 4 1 0 0 0 6 5 C5 F0 9 2 2 0 5 3 AFA0 F1 4 3 0 8 A1 2 7 9 4 3 8 8 3 1 B
:1 0 0 4 2 0 0 0 5 3 CFA0 2 7 5 4 B0 8 3 6 5 8 9 0 1 C5 F0 9 2 3 5 5 3 BFDF
:1 0 0 4 3 0 0 0 A0 2 3 0 1 8 4 1 D5 4 9 7 8 3 AA2 3 2 0 9 0 FD8 A1 0 0 2 D3
:1 0 0 4 4 0 0 0 8 6 4 0 9 AEFFA0 2 8 6 4 6 2 7 9 0 8 3 D5 B8 2 3 C5 F0 F6
:1 0 0 4 5 0 0 0 9 2 6 3 1 9 F1 C9 3 2 5 DD5 B0 5 BC5 8 4 6 7 D5 B0 3 7 F9
:1 0 0 4 6 0 0 0 C5 8 4 6 7 D5 B0 1 3 C5 5 4 C5 B8 2 3 F0 AAEA6 D1 4 8 6
:0 4 0 4 7 0 0 0 F5 9 4 0 0 8 3 7 C
:0 0 0 0 0 0 0 1 FF
```

The following comprises the program listing in machine-readable form for the type 8741 processor used in the binary output module:

```
8000 04 34 00 04 34 00 00 D5 EF 32 EA 2E 65 AB FC C6
8010 26 D3 F0 96 19 8A C2 04 1B 8A 82 BF 04 BA 01 27
8020 62 AC 45 FB C5 93 9A 3D 35 FB C5 BF 0F 93 AB FE
8030 AF FB C5 93 9A 10 8A 0D 27 B9 3F BA 20 A1 F1 96
8040 34 C9 EA 3D 22 D5 A9 53 03 C6 53 53 02 C6 57 BD
8050 F0 04 78 BD 00 04 5D BD 0F BE 3C 04 78 F9 53 0C
8060 C6 76 D3 0C C6 72 D3 08 C6 6E BE 1E 04 78 BE 0F
8070 04 78 BE 3C 04 78 BE 05 F9 C5 77 77 77 77 53 0F
8080 A9 E3 AD BE FD F9 03 10 E3 AC 8A 97 54 78 9A 18
8090 54 A5 36 9A 54 A5 26 94 09 6D E6 A5 6E E6 AE 8A
80A0 01 9A FE 04 90 09 03 F6 F6 9F 23 FF 04 B0 23 00
80B0 C6 C5 FF C6 9F FC A8 54 A5 B9 2A E9 BB E8 87 54
80C0 AA BB FF 04 9F FB C6 D2 FF C6 D2 54 00 27 AB C5
80D0 04 9F 34 00 C5 04 9F 00 00 00 00 00 00 00 00 00
80E0 00 00 00 00 00 00 00 00 00 00 00 00 00 00 00 00
80F0 00 00 00 00 00 00 00 00 00 00 00 00 00 00 00 00
8100 9A CA 8A 15 9A FE 54 A5 26 06 09 AB 03 FC E6 32
8110 D5 FD C5 C6 3F F8 03 F8 E6 28 03 F5 F6 3E D5 BF
8120 00 C5 BF F0 BA 5A 24 34 D5 BF FF C5 BF F0 BA 5C
8130 24 34 BA 65 EA 34 54 AA BA 60 EA 3A 00 00 83 F8
8140 03 F6 E6 4C 03 FB F6 89 B8 01 24 4E B8 00 89 55
8150 E9 50 27 9A EF 8A 10 B9 FE 36 6F 9A FB 36 6F 8A
8160 04 36 6F E9 59 17 36 6F 00 36 6F 36 6F 24 57 97
8170 67 96 89 F9 37 67 96 7A 23 01 A9 F8 D5 AF C5 F9
8180 D5 AA C5 BA 64 34 34 BF F0 83 00 00 00 00 00 00
8190 00 00 00 00 00 00 00 00 00 00 00 00 00 00 00 00
81A0 00 00 00 00 00 00 00 00 00 00 00 00 00 00 00 00
81B0 00 00 00 00 00 00 00 00 00 00 00 00 00 00 00 00
81C0 00 00 00 00 00 00 00 00 00 00 00 00 00 00 00 00
81D0 00 00 00 00 00 00 00 00 00 00 00 00 00 00 00 00
81E0 00 00 00 00 00 00 00 00 00 00 00 00 00 00 00 00
81F0 00 00 00 00 00 00 00 00 00 00 00 00 00 00 00 00
8200 D3 F0 C6 0D B8 0A 54 9A 54 85 96 15 83 B8 14 54
8210 9A 54 85 96 18 27 AF 83 54 1B 83 27 AF D5 FD C6
8220 5A D3 F0 C6 43 FF C6 32 8A 42 54 78 9A 3D BC F0
8230 44 3A 8A 02 54 78 9A 3D BC 0F FE AF BA 01 27 62
8240 45 25 83 FF 96 50 8A C2 54 78 9A 3D C5 BF 0F 83
8250 8A 42 54 78 9A 3D C5 BF 0F 83 FF C6 69 8A 02 54
8260 78 9A 3D FE AF BC 0F 44 73 8A 42 54 78 9A 3D FE
8270 AF BC F0 27 62 45 25 83 B9 08 B8 FF 9A DA 8A 04
8280 E8 7C E9 7A 83 B9 01 9A EF 8A 10 B8 14 54 A5 36
8290 95 E8 8D 27 83 E9 87 23 FF 83 54 A5 B9 06 E9 9E
82A0 E8 9A 54 AA 83 9A FB 8A 04 83 8A 20 54 A5 B8 06
82B0 E8 B0 9A DF 83 00 00 00 00 00 00 00 00 00 00 00
82C0 00 00 00 00 00 00 00 00 00 00 00 00 00 00 00 00
82D0 00 00 00 00 00 00 00 00 00 00 00 00 00 00 00 00
82E0 00 00 00 00 00 00 00 00 00 00 00 00 00 00 00 00
82F0 00 00 00 00 00 00 00 00 00 00 00 00 00 00 00 00
8300 9A 96 92 8E 8A 86 82 7E 7A 76 72 6E 6A 66 62 5E
8310 64 68 6C 70 74 78 7C 80 84 88 8C 90 94 98 9C A0
8320 00 00 00 00 00 00 00 00 00 00 00 00 00 00 00 00
8330 00 00 00 00 00 00 00 00 00 00 00 00 00 00 00 00
8340 00 00 00 00 00 00 00 00 00 00 00 00 00 00 00 00
8350 00 00 00 00 00 00 00 00 00 00 00 00 00 00 00 00
8360 00 00 00 00 00 00 00 00 00 00 00 00 00 00 00 00
8370 00 00 00 00 00 00 00 00 00 00 00 00 00 00 00 00
8380 00 00 00 00 00 00 00 00 00 00 00 00 00 00 00 00
8390 00 00 00 00 00 00 00 00 00 00 00 00 00 00 00 00
83A0 00 00 00 00 00 00 00 00 00 00 00 00 00 00 00 00
83B0 00 00 00 00 00 00 00 00 00 00 00 00 00 00 00 00
83C0 00 00 00 00 00 00 00 00 00 00 00 00 00 00 00 00
83D0 00 00 00 00 00 00 00 00 00 00 00 00 00 00 00 00
83E0 00 00 00 00 00 00 00 00 00 00 00 00 00 00 00 00
83F0 00 00 00 00 00 00 00 00 00 00 00 00 00 00 00 00
```

We claim:

1. A heating, ventilating and air conditioning control system, including in combination:
   a base controller;
   at least one interface unit coupled to said base controller;
   at least one base infrared transceiver coupled to said interface unit for transmitting at least a first burst of infrared energy having a unique duration to initiate a communication;
   at least one addressable remote infrared transceiver operably coupled to said base infrared transceiver through an infrared communication channel to respond to said first burst of infrared energy by detecting said unique duration to initiate a communication with said base controller; and
   at least one point interface means operatively coupled to said remote infrared transceiver.

2. The system of claim 1 further including a protocol decoder coupled to said point interface means and each said addressable remote infrared transceiver.

3. The system of claim 1 wherein said base infrared transceiver transmits signals received from said interface unit as representative time spaced pulses of infrared energy.

4. The system of claim 3 wherein said time spaced infrared pulses comprise envelopes of infrared information at a selected oscillation frequency.

5. The system of claim 4 wherein said oscillation frequency is at least 200 kHz.

6. The system of claim 2 wherein said infrared protocol decoder is responsive to time spacing of infrared pulses received by said addressable transceiver.

7. The system of claim 1 wherein said interface unit further comprises a protocol decoder responsive to the time spacing of infrared pulses received from the remote transceiver.

8. The system of claim 4 wherein said remote transceiver is selectively responsive to infrared pulse envelopes at a predetermined oscillation frequency.

9. The system of claim 2 wherein said protocol decoder, is responsive to information received from said point interface means to provide signals to said remote transceiver.

10. The system of claim 9 wherein said remote infrared transceiver is responsive to signals received from said protocol decoder to transmit time spaced pulses of infrared information.

11. The system of claim 10 wherein said time spaced infrared pulses comprise envelopes of infrared information at a preselected oscillation frequency.

12. The system of claim 11 wherein said oscillation frequency is at least 200 kHz.

13. The system of claim 12 wherein said interface unit further comprises a protocol decoder.

14. The system of claim 13 wherein said interface unit is responsive to the time spacing of infrared pulses received at said base transceiver to provide information to said base controller representative of conditions at said point interface means.

15. The system of claim 11 wherein said base transceiver is selectively responsive to infrared pulse envelopes at a predetermined oscillation frequency.

16. The system of claim 3 wherein said at last one remote transceiver comprises a plurality of remote infrared transceivers, each having an associated protocol decoder and at least one associated point interface means.

17. The system of claim 16 wherein said associated protocol decoder for each remote infrared transceiver is responsive to an individual address code.

18. The system of claim 17 wherein said address code is represented by an individual, predetermined spacing between selected ones of said spaced infrared pulses.

19. The system of claim 16 further including a plurality of base infrared transceivers, each having an associated interface unit, said interface units being coupled to said base controller.

20. A heating ventilating and air conditioning control system, including in combination:
   a base controller;
   a plurality of interface units coupled to said base controller;
   at least one base infrared transceiver coupled to each of said interface units for transmitting signals received from said interface unit as representative time spaced pulses of infrared energy, each of said base infrared transceivers being operable to send and receive infrared pulse envelopes at a predetermined oscillation frequency, distinct from the operating frequencies of the remainder of the base transceivers;
   a plurality of addressable remote infrared transceivers, each having an associated protocol decoder, operably coupled to said base infrared transceiver through an infrared communication channel; and
   at least one point interface means operatively coupled to each remote infrared transceiver.

21. The system of claim 20 wherein selected ones of said remote infrared transceivers operate to send and receive infrared pulse envelopes at a predetermined oscillation frequency corresponding to one of said base transceiver operating frequencies.

22. A remote controlling system comprising, in combination:
   a central controller;
   at least one base station having interface means coupled to a base controller and at least one infrared transceiver means operatively coupled to said interface means for transmitting a first infrared pulse having identifiable special characteristics to initiate a communication; and
   at least one remote station having infrared transceiver means operatively coupled via an infrared communication channel to said base transceiver and responsive to detection of said first infrared pulse by recognition of said identifiable special characteristics to transmit a second duration infrared pulse at a predetermined time after detection to initiate a communication, said predetermined time identifying the remote station, at least one input/output device and protocol means operatively coupled to said transceiver and said input/output device to decode information received by said transceiver and to encode information from said input/output device.

23. The system of claim 22 wherein said infrared pulse having identifiable special characteristics comprises a burst of infrared energy having a preselected duration and said remote station detects said preselected duration to initiate communication.

24. The system of claim 23 wherein said burst of infrared energy comprises a pulse train of infrared pulses at a selected oscillation frequency.

25. In a heating, ventilating and air conditioning control system, base controller apparatus for use in conjunction with remote control devices comprising:
a central system controller,
at least one interface means connected with said central controller to process signals to and from said controller; and
base infrared transceiver means coupled to said interface means for transmitting signals from and receiving signals for said central system controller via an infrared communication channel with at least one addressable remote station, the time and duration of said transmitted and received signals being representative of the information to be communicated between said central controller and said remote devices, said base infrared transceiver means initiating each communication by transmitting an infrared pulse of predetermined characteristics.

26. The system of claim 25 wherein said infrared pulse of predetermined characteristics comprises a burst of infrared energy having a preselected duration and said remote station detects said preselected duration to initiate communication.

27. The system of claim 26 wherein said burst of infrared energy comprises a pulse train of infrared pulses at a selected oscillation frequency.

28. In a heating ventilating and air conditioning control system, addressable remote control apparatus for use with a central controller comprising:
at least one input/output means for monitoring and controlling at least one function in the heating ventilating and air conditioning system; and
addressable remote transceiver means for transmitting signals from said input/output means to said central controller and receiving control signals from said central controller for said input/output means via infrared communication, the time of transmission and receipt and the duration of said signals being representative of the information to be communicated, each communication between said remote transceiver means and said central controller being initiated by detection of an infrared pulse of predetermined characteristics transmitted by said central controller.

29. The system of claim 28 further including protocol decoder means intermediate said input/output means and said remote infrared transceiver means for coding and decoding said infrared signals.

30. The system of claim 28 wherein said infrared pulse of predetermined characteristics comprises a burst of infrared energy having a preselected duration and said remote station detects said preselected duration to initiate communication.

31. The system of claim 30 wherein said burst of infrared energy comprises a pulse train of infrared pulses at a selected oscillation frequency.

32. A method of effecting digital communications using infrared light including the steps of:
transmitting a first burst of infrared energy having a unique duration to initiate communication;
receiving said first burst of infrared energy at a displaced location;
detecting said unique duration of said first burst as a communication initiation;
transmitting a second burst of infrared energy of a second duration at a selected period after said first burst, said selected period being indicative of the information to be communicated;
receiving said second burst of infrared energy at said displaced location;
detecting said selected period; and
decoding said information from said detected selected period.

33. The method of claim 32 wherein the information decoded from said detected period is the identity of a selected one of a plurality of remote communication points at displaced locations.

34. The method of claim 32 wherein said step of receiving said first burst of infrared energy comprises receiving said first burst of infrared energy at a plurality of remote communication points at displaced locations.

35. The method of claim 34 wherein said step of transmitting a second burst of infrared energy comprises transmitting a second burst of infrared energy at a selected period after said first burst, said selected period being indicative of a desired one of said plurality of remote points to be addressed.

36. The method of claim 35 wherein said step of detecting said selected period comprises detecting said selected period only at said desired one of said plurality of remote points.

37. The method of claim 36 further including:
transmitting a responsive burst of infrared energy from said remote point at a predetermined time, said predetermined time being indicative of the information to be communicated by said remote point; and
detecting the elapse of said predetermined time to decode said information being communicated by said remote point.

38. The method of claim 34 wherein:
said step of transmitting a first and a second burst of infrared energy comprise transmitting a first and a second envelope of infrared pulses at a preselected oscillation frequency; and
said steps of receiving said first and second bursts of infrared energy comprise receiving said first and second envelopes of infrared pulses at one or more remote points tuned to said oscillation frequency.

39. An infrared communications system comprising:
base means for transmitting a first burst of infrared energy having a unique duration to initiate communication and for transmitting a second burst of infrared energy of a second duration at a selected period after said first burst, said selected period being indicative of the information to be communicated;
remote means for receiving said first and second bursts of infrared energy at a displaced location;
detecting means associated with said remote means for detecting said unique duration of said first burst as a communication initiation and for detecting said selected period; and
decoding means associated with said remote means for decoding said information from said detected selected period.

40. The system of claim 39 wherein said remote means further comprises transmitting means for transmitting an identification pulse at a predetermined time after said first burst of infrared energy to identify said remote means and for transmitting a reporting pulse at a selected period after said identification pulse, said selected being representative of the information to be transmitted from said remote means to said base means.

41. The system of claim 39 wherein:
said first and second bursts of infrared energy are transmitted by said base means at a preselected oscillation frequency; and
said detecting means associated with said remote means responds to said preselected oscillation frequency.

* * * * *